PRIVATE LINE INTERCOMMUNICATING TELETYPEWRITER SYSTEM

Filed Dec. 11, 1951 11 Sheets-Sheet 1

INVENTORS G. A. LOCKE
L. E. MELHUISH
B. OSTENDORF, JR.
BY R. C. Terry
ATTORNEY

PRIVATE LINE INTERCOMMUNICATING TELETYPEWRITER SYSTEM

Filed Dec. 11, 1951 11 Sheets-Sheet 2

| | | | |
|---|---|---|---|
| FIG.2 | FIG.3 | | |
| FIG.4 | FIG.5 | FIG.6 | FIG.7 |
| FIG.8 | FIG.9 | FIG.10 | FIG.11 |

INVENTORS G. A. LOCKE
L. E. MELHUISH
B. OSTENDORF, JR.

BY R. C. Lerry
ATTORNEY

INVENTORS G. A. LOCKE
L. E. MELHUISH
B. OSTENDORF, JR.
BY R. C. Perry
ATTORNEY

Aug. 2, 1955 G. A. LOCKE ET AL 2,714,626

PRIVATE LINE INTERCOMMUNICATING TELETYPEWRITER SYSTEM

Filed Dec. 11, 1951 11 Sheets-Sheet 4

INVENTORS G. A. LOCKE
L. E. MELHUISH
B. OSTENDORF, JR.
BY R. C. Terry
ATTORNEY

INVENTORS G. A. LOCKE
L. E. MELHUISH
B. OSTENDORF, JR.
BY
R. C. Terry
ATTORNEY

PRIVATE LINE INTERCOMMUNICATING TELETYPEWRITER SYSTEM

Filed Dec. 11, 1951 11 Sheets-Sheet 6

INVENTORS G. A. LOCKE
L. E. MELHUISH
B. OSTENDORF, JR.
BY R. C. Perry
ATTORNEY

INVENTORS G. A. LOCKE
L. E. MELHUISH
B. OSTENDORF, JR.
BY R. C. Perry
ATTORNEY

PRIVATE LINE INTERCOMMUNICATING TELETYPEWRITER SYSTEM

Filed Dec. 11, 1951 11 Sheets-Sheet 8

INVENTORS G. A. LOCKE
L. E. MELHUISH
B. OSTENDORF, JR.
BY R. C. Terry
ATTORNEY

PRIVATE LINE INTERCOMMUNICATING TELETYPEWRITER SYSTEM

Filed Dec. 11, 1951 11 Sheets-Sheet 9

INVENTORS G. A. LOCKE
L. E. MELHUISH
B. OSTENDORF, JR.
BY R. C. Perry
ATTORNEY

PRIVATE LINE INTERCOMMUNICATING TELETYPEWRITER SYSTEM

Filed Dec. 11, 1951 11 Sheets-Sheet 10

INVENTORS G. A. LOCKE
L. E. MELHUISH
B. OSTENDORF, JR.
BY
R. C. Perry
ATTORNEY

PRIVATE LINE INTERCOMMUNICATING TELETYPEWRITER SYSTEM

INVENTORS G. A. LOCKE
L. E. MELHUISH
B. OSTENDORF, JR.
BY R. C. Terry
ATTORNEY

United States Patent Office 2,714,626 Patented Aug. 2, 1955

2,714,626

PRIVATE LINE INTERCOMMUNICATING TELETYPEWRITER SYSTEM

George A. Locke, Glen Head, N. Y., Lawrence E. Melhuish, Glen Ridge, N. J., and Bernard Ostendorf, Jr., Stamford, Conn., assignors to Bell Telephone Laboratories, Incorporated, New York, N. Y., a corporation of New York Application December 11, 1951, Serial No. 261,022

13 Claims. (Cl. 178—2)

This invention relates to a private intercommunicating teletypewriter system having various types of lines, such as multistation lines, single station lines and trunks, and more particularly, to an automatic multiaddress arrangement at one or more special transmitting stations on single station or multistation lines of a private intercommunicating teletypewriter system for transmitting messages to predetermined groups of receiving stations of the private teletypewriter intercommunicating system.

By means of the automatic multiaddress arrangement a message which has been received at a special transmitting station and typed on a teletypewriter whereat it is also recorded on a perforated tape for retransmission, may have address code signals inserted ahead of it, either manually or automatically, and be transmitted into the teletypewriter system, or be transmitted directly to a loop locally connected to the special transmitting station without an address code signal, or be discarded. A copy of each message will be printed at the teletypewriter and retained regardless of the disposition of the message.

An object of the invention is to minimize the time and effort in affixing address code signals to a message to be transmitted to a predetermined group of stations under the switching control of their respective address code signals in a private intercommunicating teletypewriter system.

A specific object is to enable an operator who records an orally or telephonically received message on a teletypewriter perforator to route or discard the message, after receiving the whole of it, without loss of time, thus freeing him or her to receive another message or attend to other duties.

According to the present invention a multiaddress message transmission set is provided for generating address code signals for automatically directing a message to receiving printers at one or more stations in a private line teletypewriter intercommunicating system. The set comprises a page-type teletypewriter and associated therewith a plurality of dispatcher's call buttons and two reperforator-transmitters. The teletypewriter, in being operated to record thereon an incoming message, causes the message to be perforated in the tape of the first reperforator-transmitter. The momentary operation of any one of a plurality of dispatcher's call buttons automatically causes an end-of-message signal to be perforated in the tape of the first reperforator-transmitter and one or more predetermined pairs of permutation code signals, each pair corresponding to and representing the address code of a receiving printer, to be perforated in tape in the second reperforator-transmitter. The last pair of a group of address code signals perforated in the tape is automatically followed by an end-of-address code signal in permutation code after which the message and end-of-message signal from the tape of the first reperforator-transmitter are automatically transferred to the tape of the second reperforator-transmitter for transmission to the one or more selected receiving printers designated by the address code signals. If the addresses for the message are not those of a predetermined group of receiving printers for which there is an automatic address call button, the dispatcher operates a locking manual address key which shifts the connection of the teletypewriter keyboard from the first reperforator-transmitter to the second reperforator-transmitter and then operates the keyboard to generate the address code signals corresponding to the desired receiving printers. The manual address key is released after the individually transmitted address code signals are sent to the second reperforator-transmitter. The release of the manual address key will automatically cause the message in the first reperforator-transmitter to be transferred to and stored in the second reperforator-transmitter following the address codes.

A feature of the invention is the provision of means for automatically addressing and dispatching a message to one or more receiving printers in a private intercommunicating teletypewriter system.

Another feature is the provision of means for storing dispatched messages and transmitting them into a private intercommunicating teletypewriter system with normal station procedure.

Another feature is the provision of means for the disposal of any message which should not be transmitted to the private intercommunicating teletypewriter system.

Another feature is the provision of means for receiving and retaining a copy of an incoming message when the dispatching and transmitting portions of the system are inoperable.

The above and other objects and features of this invention are set forth in the following description and appended claims and may be more readily understood and considered in conjunction with the accompanying drawings of which:

Fig. 1 shows a diagrammatic layout of a specially arranged transmitting station operating into a private intercommunicating teletypewriter system comprising among other line circuits a multistation line circuit;

Figs. 2 to 11, inclusive, show in schematic form a special transmitting station which operates into a private intercommunicating teletypewriter system, with only such equipment shown as is necessary for a clear understanding of the invention;

GENERAL DESCRIPTION

Figure 1:
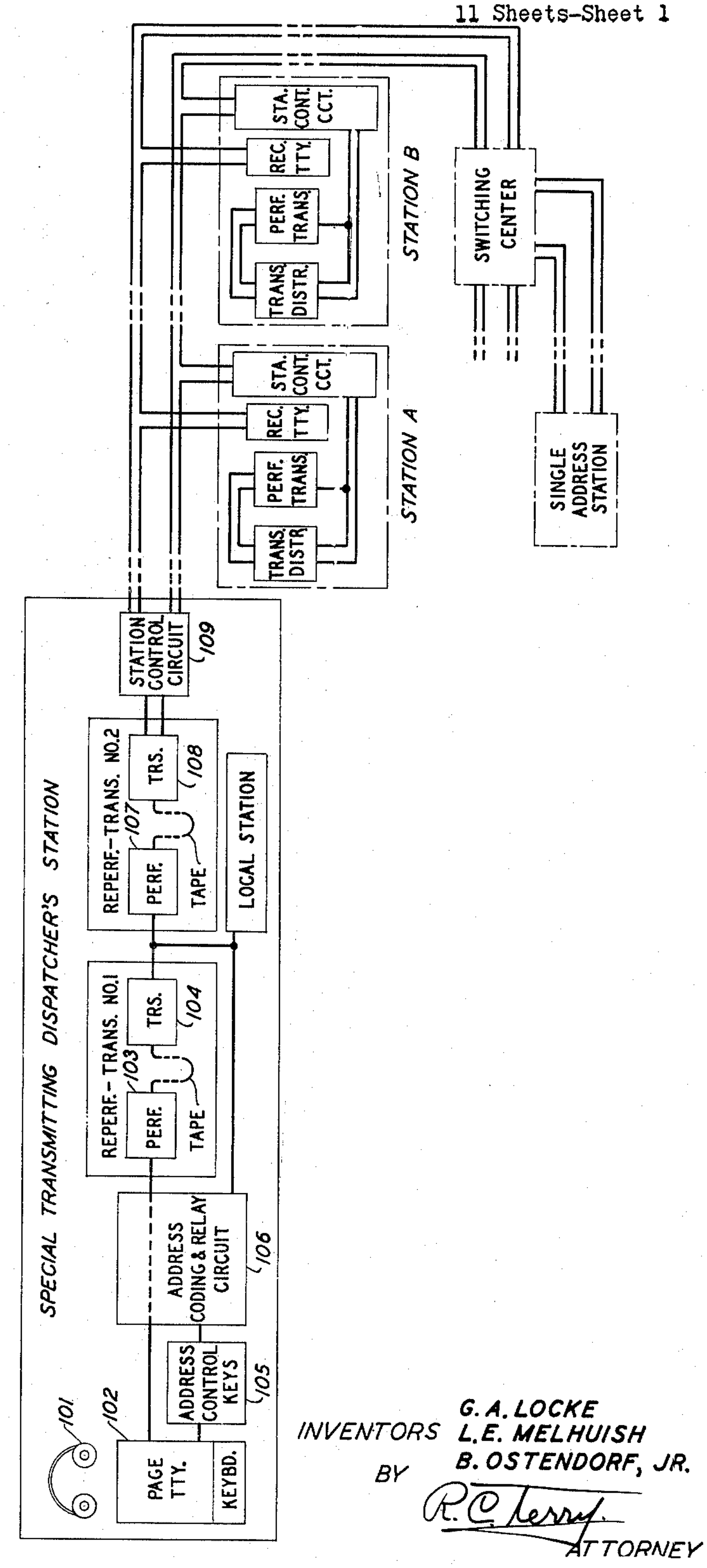

The use of reference characters on the drawing follows a definite plan. In Figs. 2 to 11, inclusive, all relays and keys and certain conductors have reference characters consisting of numerals and letters, the numerals shown as prefixes corresponding to the number of the figure in which each relay or key is located or the conductor originates. All other parts of the system are designated by numerals only, for example, those parts of Fig. 1 are designated with numerals between 100 and 199, those of Fig. 2 are designated with numerals between 200 and 299, and so forth, wherein the first, or hundreds, digit designates the figure in which the particular part was found.

The private intercommunicating teletypewriter system may have one or more switching centers and may be of the type such as disclosed in the patent application of W. M. Bacon et al., Serial No. 119,184, filed October 1, 1949. Alternatively it may be of the type shown in Branson-Kinkead-Krecek-Locke Patent 2,430,447, granted November 11, 1947. The dispatcher's teletypewriter which is designed to send and receive in the five-unit start-stop code is of the page type such as disclosed in S. Morton et al. Patent 1,906,164, issued April 18, 1933. The reperforator-transmitter may be of the type disclosed in Gubisch Patent 2,348,214, issued May 9, 1944, and employed in the system disclosed in W. M. Bacon et al., supra. These disclosures are hereby made a part of this application as is fully set forth herein.

Figures 2, 12:
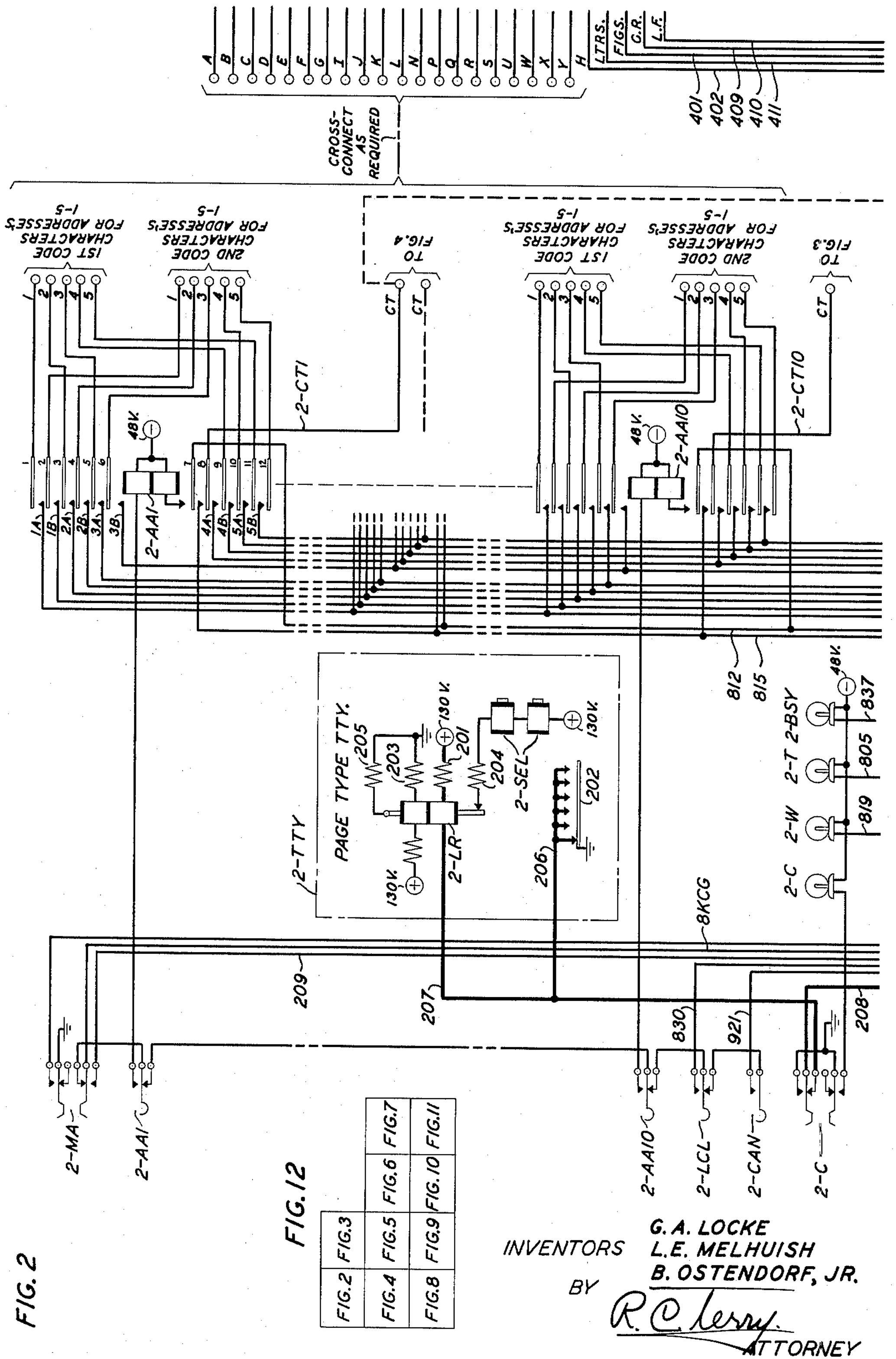
Fig. 2 shows the dispatcher's page-type teletypewriter and a set of control keys associated therewith, a set of multicontrol relays respectively controlled by the automatic address call keys of the control set whereby the code character signals for a predetermined group of receiving printers in the switching system are selected.
Fig. 12 shows the relative arrangement of Figs. 2 to 11, inclusive.

As represented in Fig. 1 the dispatcher receives in his telephone headset 101 a voice message which may be incoming over a radio channel from either an airplane, in flight, or a distant station, or in any other manner over a cable or wire from another station, local or remote. He immediately types the message on teletypewriter 102 wherein the message is recorded for his record and at the same time automatically transmitted to perforator 103 of reperforator-transmitter No. 1. The message is perforated in the tape of reperforator-transmitter No. 1. The momentary operation of an address key causes an end-of-message signal to be automatically recorded on the tape, following the last character signal of the message.

The appearance of tape in the reperforator-transmitter No. 1 conditions the dispatcher's address control keys 105 for operation. Control keys 105 are of two types, namely locking and non-locking. The call, or automatic address, keys of control keys 105 to which the present invention is particularly directed, are of the non-locking type. Each of these automatic address keys when momentarily operated, serves to select the code combinations designating one or more receiving printers at one or more stations connected to the lines of the system. The system permits multiaddress messages to be sent to all stations or to prearranged groups by a single group code; or to any number of stations by using address codes for the individual stations. When any one of these automatic address keys is momentarily operated there is automatically selected by means of the address coding and relay circuit 106 and automatically transmitted to perforator 107 of reperforator-transmitter No. 2, one to five predetermined pairs of code signals of a group. The predetermined signal pairs of the selected group are perforated in the tape in perforator 107 and there is automatically recorded an end-of-address signal following the last address pair. When the end-of-address signal is recorded on the tape of reperforator-transmitter No. 2, the address circuit is effective to start transmitter 104 of reperforator-transmitter No. 1 whereby the message on the tape in perforator 103 is automatically transferred to the tape of perforator 107, the message appearing thereon following the end-of-address signal. The presence of message tape in reperforator-transmitter No. 2 closes the transmitter-stop contacts of the machine by well-known mechanical means thereby furnishing an indication to the station control circuit that a message is available. At intervals the transmitter start circuit at a switching center of the private line intercommunicating teletypewriter system sends to the station control circuit a "transmitter start" code signal including a single letter character signal corresponding to the dispatcher's station. Receipt of the correct transmitter start code during a "message available" condition causes the station control circuit to operate a start relay at the dispatcher's station whereby the transmitter 108 of the reperforator-transmitter No. 2 is operated to transmit the waiting message to the sending side of the multistation line to which the station control circuit is connecetd.

*Automatically addressed message*

If the address for a message is to be automatically transmitted the dispatcher will momentarily operate a non-locking key such as any one of keys 2–AA1 to 2–AA10, which has been assigned to a single predetermined address or to a prearranged group of addresses. The circuit will then process the message on reperforator-transmitter No. 1 and when such message is transmitted to and recorded on the tape of reperforator-transmitter No. 2 it is held on the tape in reperforator-transmitter No. 2 until the circuit receives permission to send, which permission is given by the transmitter start circuit.

In processing a message in reperforator-transmitter No. 1 the end-of-message code signal consisting of code combinations for "Figures," "H" and "Letters," in sequence, will be inserted automatically at the end of the message on the tape of reperforator-transmitter No. 1. The circuit will then cause to be transmitted to reperforator-transmitter No. 2 the address code signals, a pair for each address, determined by the address control key that was operated at the time. A "Letters" signal is automatically transmitted after each pair of address code signals, except the last, at which time an end-of-address signal is transmitted. Printer selector magnet 11–SEL upon responding to the impulses of each signal combination of the address causes the corresponding signals to be perforated on the tape of reperforator-transmitter No. 2. The end-of-address signal consists of signal code combinations for "carriage return," "line feed" and "Letters" and these are automatically transmitted and recorded on the tape of reperforator-transmitter No. 2, in the order mentioned, immediately following the last code signal of the address. Then the message stored on the tape of reperforator-transmitter No. 1 is automatically transferred to the tape of reperforator-transmitter No. 2 whereby the message will be recorded immediately following the end-of-address signal. In response to the transmission of the end-of-address signal from the tape of reperforator-transmitter No. 1 to the tape of reperforator-transmitter No. 2 the address circuit is restored to its idle condition.

During the time when the address circuit is processing the message, that is, transferring it from the tape in reperforator-transmitter No. 1 to the tape in reperforator-transmitter No. 2 a supervisory lamp 2–W will be lighted to indicate to the dispatcher that no other address key can be operated. During the interval when the end-of-message signal is being recorded on the tape of reperforator-transmitter No. 1 the keyboard of the teletypewriter and the dispatcher's control keys are disabled. It is not until the message is completely transmitted that the dispatcher's control keys are again enabled. The keyboard of the teletypewriter will again be operable at the end-of-message interval unless the dispatcher operates the manual address key 2–MA and attempts to use the keyboard for typing addresses into the reperforator-transmitter No. 2 which is already busy processing the current message. In this case the keyboard continues to be disabled until the message is processed and stored in the reperforator-transmitter No. 2. Lamp 2–T will not in this case be lighted when the manual address key 2–MA is operated, showing the dispatcher that the manual address key was incorrectly operated. Dispatcher control keys are always held in the disabled condition until the current message is in the reperforator-transmitter No. 2, leaving it idle to receive the addresses of the next message. The restoration of the dispatcher's control key is indicated by lamp 2–W becoming extinguished.

When the teletypewriter keyboard is again operable as hereinbefore described, another incoming message may be typed and will be recorded on the tape in the reperforator-transmitter No. 1, but this message will not be dispatched until lamp 2–W becomes extinguished.

When any dispatching key is operated all other dispatching keys are disabled so that only one dispatching key may be operated for each message. As hereinbefore stated, each automatic address dispatching key may be arranged to control from one to five address codes. Any number of automatic address dispatching keys may be provided. Each key must be accompanied by a relay. Each address code consists of any two of the following letter characters: A, B, C, D, E, F, G, I, J, K, L, N, P, Q, R, S, U, W, X and Y in accordance with known commercial practice in inter-communicating teletypewriter systems. Messages may be typed and dispatched one at a time up to the capacity of the tape bin of the reperforator-transmitter No. 2.

*Manually addressed message*

If the address for the message is not to be automatically transmitted the dispatcher must supply the addresses from the keyboard on teletypewriter 102. To describe how this is done reference is made to Fig. 2 wherein the dispatcher's teletypewriter is designated 2–TTY. The dispatcher will operate manual address key 2–MA which will shift the keyboard connection to the reperforator-transmitter No. 2 (shown in schematic form in Fig. 11), and then type the address code of the desired station or stations by means of the teletypewriter keyboard. Manual address key 2–MA is of the locking type. The supervisory lamp 2–T will be lighted while manual address key 2–MA is locked-operated to indicate that the address circuit is conditioned for "typing addresses" only. A "Letters" signal should be typed following each address code. When manual address key 2–MA is released the address circuit will process the message in reperforator-transmitter No. 1 in substantially the same manner as described hereinbefore for a message having a predetermined address or a predetermined arranged group of addresses.

Figure 6:
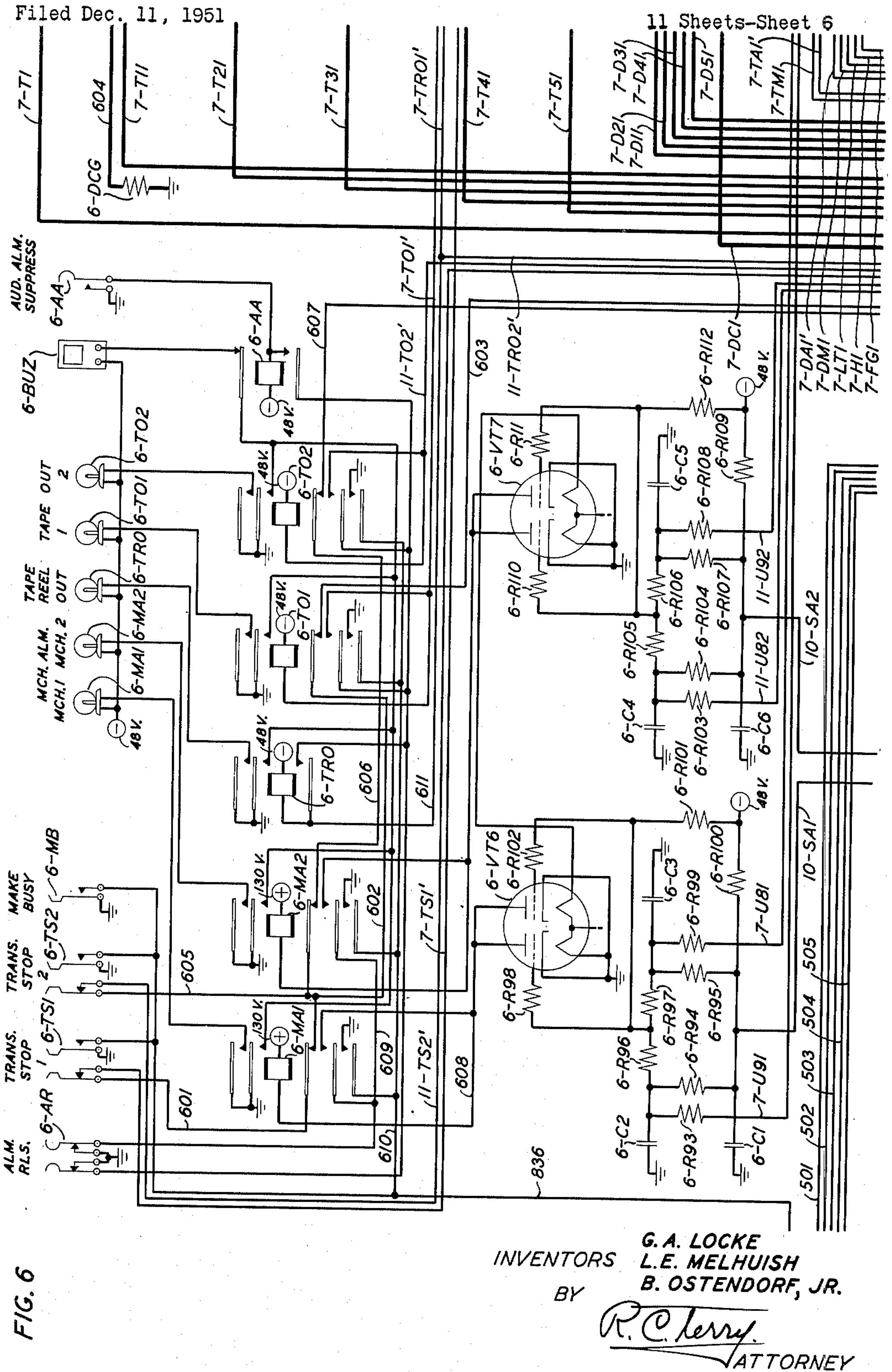
Fig. 6 shows the alarm circuit.
Figure 7:
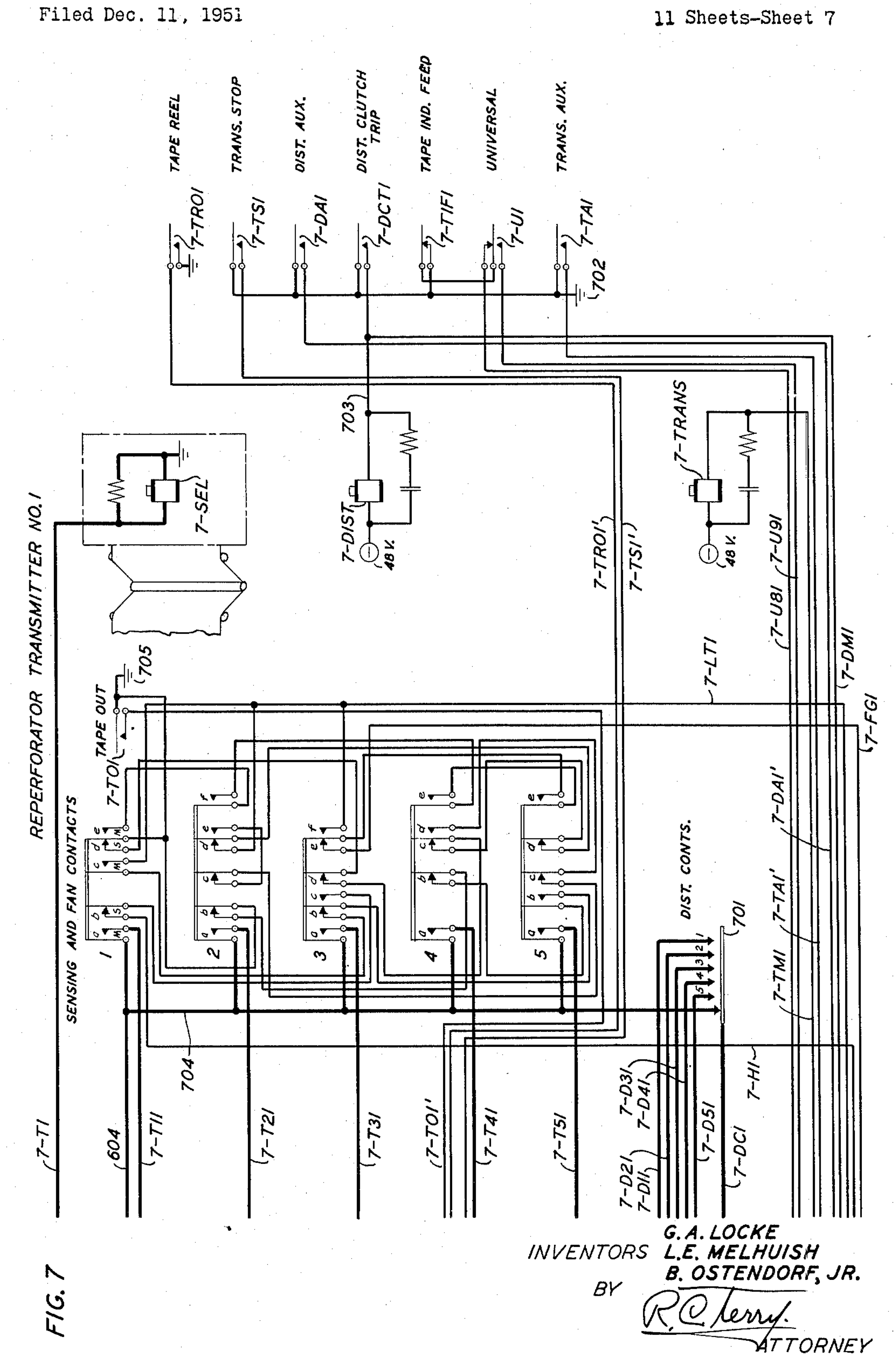
Fig. 7 shows the reperforator-transmitter No. 1 in which the incoming message is automatically recorded in response to typing of the message at the dispatcher's page-type teletypewriter.
Figure 8:
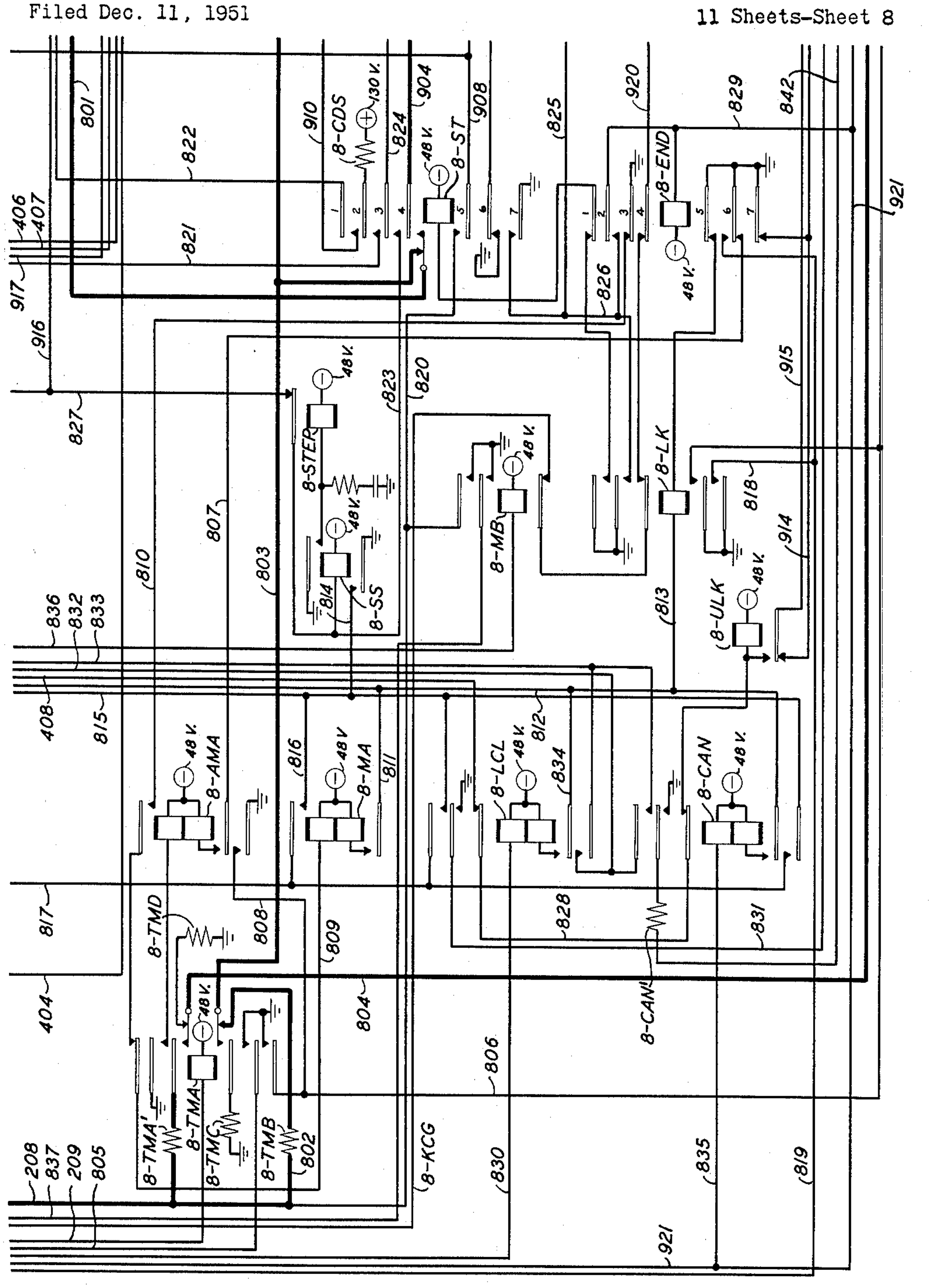
Figs. 8, 9 and 10 show the relay circuit which serves to transfer the message from reperforator-transmitter No. 1 to reperforator-transmitter No. 2.
Figure 9:
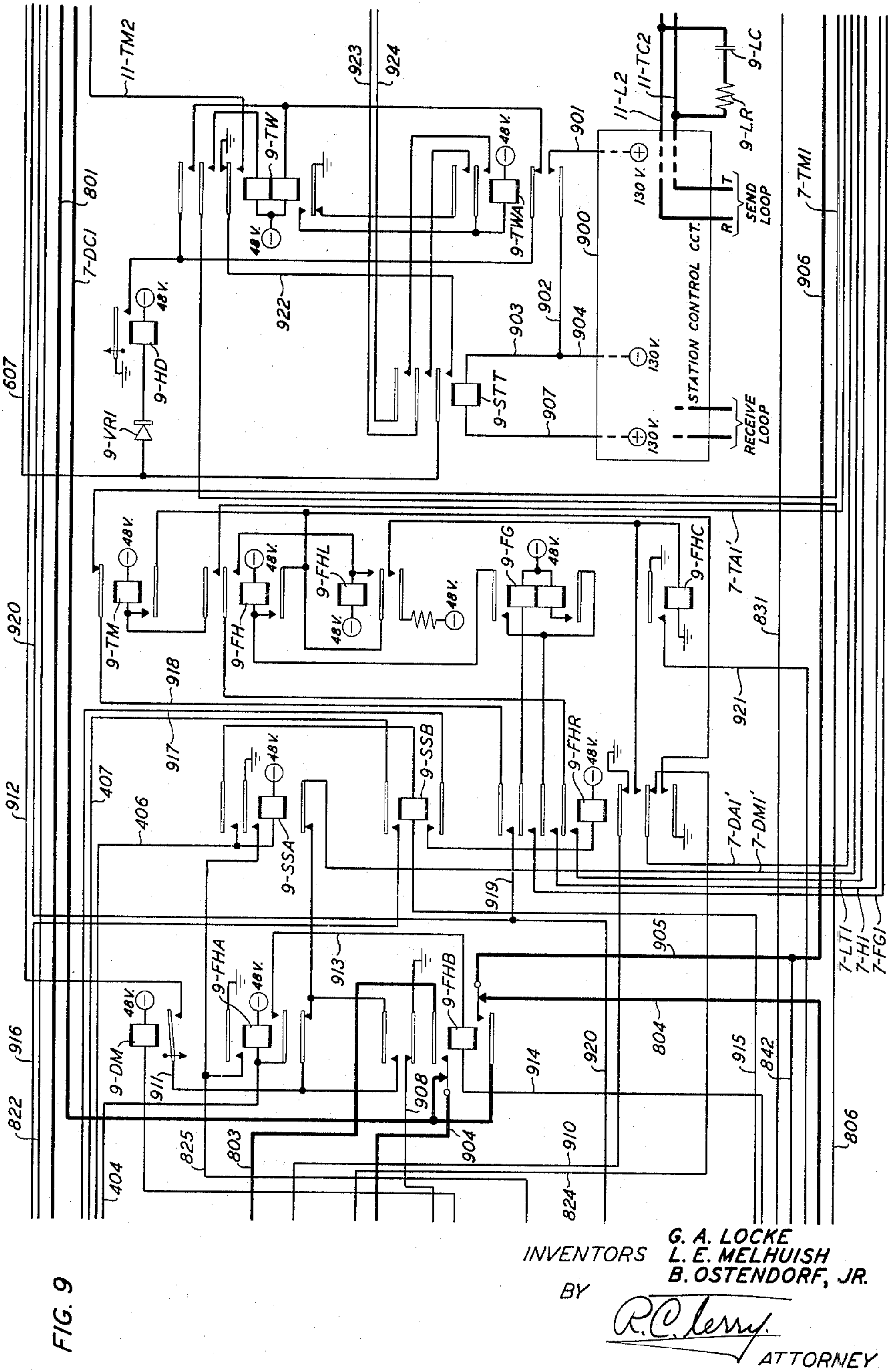
Figure 10:
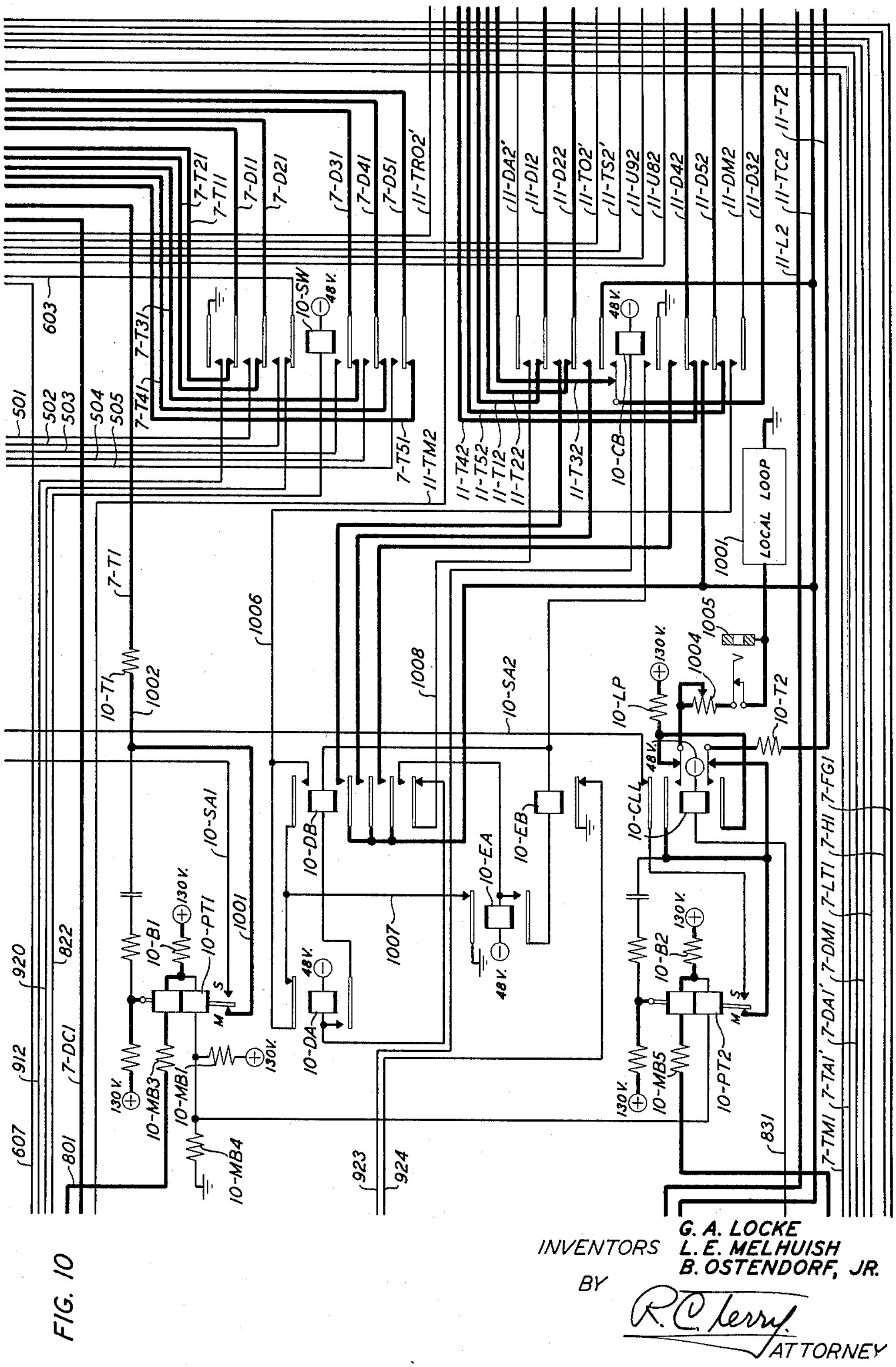
Figure 11:
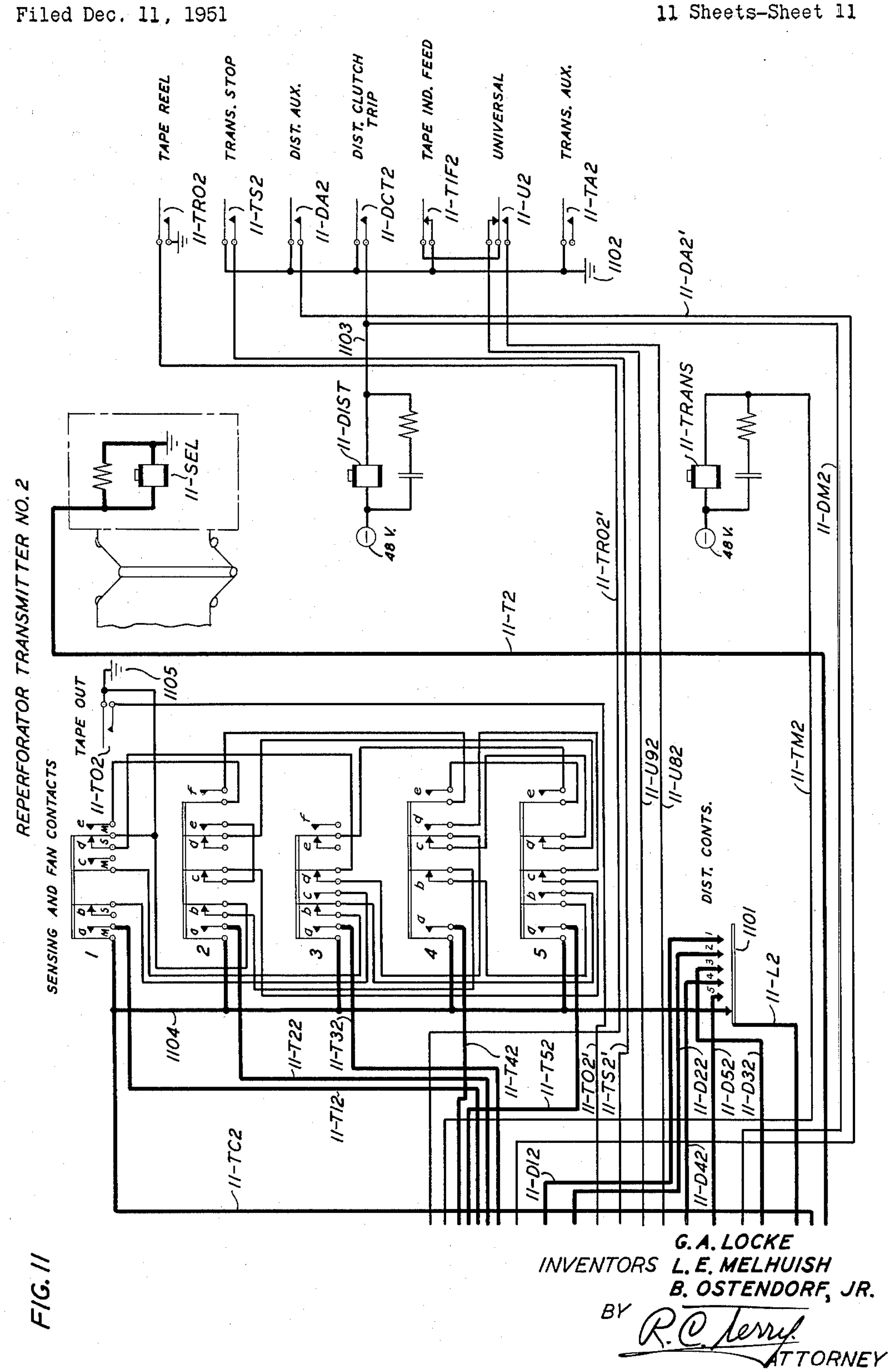
Fig. 11 shows the reperforator-transmitter No. 2 in which the address code signals and the message transcribed from reperforator-transmitter No. 1 are stored for retransmission to a switching center for routing to the addressed stations.

In case a message is typed or dispatched to a reperforator-transmitter which is not operating correctly a "machine-alarm" such as shown in Fig. 6, will be operated which will alert the attendant at the machine cabinet, disable the keyboard and the dispatching keys and warn the dispatcher that the circuit is not available. The alarm must be cleared by the attendant at the machine cabinet. A similar state of alarm will be caused by absence of tape in the transmitter head of either reperforator-transmitter. The same state of alarm may be produced by the attendant at the machine cabinet by operating make-busy key 6–MB. Buzzer 6–BUZ serves with either of machine lamps 6–MA1 and 6–MA2 for furnishing an alarm when the corresponding one of the reperforator-transmitters is not operating correctly and with either of tape-out lamps 6–TO1 and 6–TO2 when there is an absence of tape in the corresponding one of the reperforator-transmitters. The tape-reel-out lamp 6–TRO1 also lights when the supply of tape in either reperforator-transmitter is exhausted.

The teletypewriter keyboard used in this circuit is so arranged mechanically, that the "end-of-message" code signal cannot be sent from it. An arrangement for accomplishing this is shown in copending application Serial No. 220,564, filed April 12, 1951, by D. E. Branson.

*Local message*

If the message requires no address, that is, it concerns only the station such as the local receiving station shown in Fig. 1, the dispatcher will operate and release a "local-message" key 2–LCL. The operation of this key which is non-locking will cause the transmitting mechanism of the reperforator-transmitter No. 1 to transmit the message directly into a local loop without the addition of any address codes. The same supervisory functions will operate as hereinbefore described in connection with the message requiring the operation of an automatic address key.

*Cancel message*

When all or part of an incoming message has been typed and it is found that the message should not be transmitted into the private line intercommunicating teletypewriter system or the local loop, the dispatcher will operate a cancel-message key 2–CAN. The operation of this key which is non-locking will prevent operation of polar telegraph relay 10–PT2 which controls reperforator-transmitter No. 2 or the local loop. It will then initiate the same sequence of circuit operation as described above for a local message but the message will be cancelled instead of appearing in either the reperforator-transmitter No. 2 or the local loop.

*Copy only*

When the circuit is inoperable for reasons not evident to the dispatcher, a supervisory lamp 2–W will be lighted as described hereinbefore for a message requiring the operation of an automatic address key. If the dispatcher wishes to type an incoming message at this time the "copy-only" key 2–C may be operated. The operation of this key which is locking, will restore the operation of the keyboard and the switching mechanism of the dispatcher's teletypewriter but will not permit any message tape to be set up in reperforator-transmitter No. 1. A supervisory lamp 2–C will be lighted during the "copy-only" condition. The release of the "copy-only" key 2–C will restore the address circuit to normal. Messages copied during the "copy-only" interval may be retyped from the copy and dispatched in the usual way or handled in some other manner. The "copy-only" key must be used in making a local test of the teletypewriter.

*Transmission of messages to the line*

In private teletypewriter intercommunicating systems such as disclosed in the W. M. Bacon et al. patent application, supra, it becomes desirable to permit transmission from any of the outlying stations to a central, or switching, center. Such transmission is automatically controlled from the switching center by sending periodically therefrom a group of code signals identified as a transmitter-start pattern, the function of which is to start transmission from selected ones of such outlying stations in any predetermined sequence. Located at each outlying station is a "Sotus" unit which is provided with contacts that are operated as a result of ultimate selections to perform switching and other operations. A "Sotus" unit is shown and described in W. M. Bacon et al. patent application, supra. In the case of the control of transmitters at outlying stations single code combinations are employed for effecting the desired controls whereas the receivers, such as printers or reperforators at such outlying stations are connected selectively to the receiving channel by address codes comprising a sequence of two code combinations. The selecting code combinations are automatically transmitted from the central station, or switching center. The transmitter start-pattern together with the station selecting code signal, is effective through the "Sotus" unit in station control circuit 900 to connect at predetermined intervals grounded positive battery to conductors 901 and 907 and grounded negative battery or ground to conductor 903, whereby any message stored in reperforator-transmitter No. 2 may be transmitted into the private teletypewriter intercommunicating system.

The prepared messages are held in the reperforator-transmitter No. 2. The presence of any message tape in this machine will result in closure of its transmitter-stop contacts 11–TS2 by mechanical means.

When the transmitter-stop contacts 11–TS2 of the reperforator-transmitter No. 2 are closed relays 9–HD and 9–TWA operate. Relay 9–TWA, upon operating, applies grounded positive battery connected to conductor 901 in the station control circuit 900 to control negative conductor 904 for performing functions in the station control circuit. In order to prepare reperforator-transmitter No. 2 for transmitting its stored message the functions completed in the station control circuit in response to the transmission start pattern and the selecting single code, connect grounded battery to conductor 907 which causes relay 9–STT to operate. Relay 9–STT upon operating, prepares reperforator-transmitter No. 2 to transmit its stored message over the send loop of station control circuit 900 to the multistation line. Therefore, at intervals a transmitter at the switching office of the private intercommunicating teletypewriter system sends to the station control circuit the transmitter start pattern and a single letter signal combination corresponding to the special transmitting station wherein the address circuit is located. The receipt of the correct transmitter selecting code signal causes the station control circuit to operate relay 9–STT and thereby close the operating path for transmitter clutch release magnet 11–TRANS of reperforator-transmitter No. 2. The detailed description of the station control circuit is shown in an application of W. M. Bacon et al., supra.

When the last character of the last message on the tape in reperforator-transmitter No. 2 has been transmitted the transmitter-stop contact 11–TS2 of this reperforator-transmitter will be opened by mechanical means. When this occurs the address circuit will send an "end-of-transmission" code signal consisting of an "H" and a "Letters" signal combinations to the line. The address circuit will then restore itself to the idle condition, that is, with no message tape waiting in the reperforator-transmitter No. 2.

If the circuit is processing a message when transmitter-stop contact 11–TS2 of the reperforator-transmitter No. 2 is opened as described in the preceding paragraph, the "end-of-transmission" code will not be sent by the circuit. In this case, the reperforator-transmitter No. 2 will be stopped but it will resume operation as soon as the succeeding message reaches it and closes its transmitter-stop contacts 11–TS2. This cycle of operation will continue until there is no further message either in the reperforator-transmitter No. 2 or in process in the address circuit.

*Electron tube coding circuit*

This circuit consists of five vacuum tubes 5–VT1, 5–VT2, 5–VT3, 5–VT4 and 5–VT5 and the resistance networks connected to their respective elements. Each of these five tubes represents one of the five signal elements of the teletypewriter code and receives its plate current supply through the upper winding of polar telegraph repeating relay 10–PT1 or 10–PT2 when relay 10–SW is operated, the distributor common conductor 7–DC1 and one of the five distributor contacts 701 on reperforator-transmitter No. 1. Whether polar telegraph repeating relays 10–PT1 or 10–PT2 is included in the circuit just traced depends upon the condition of relay 9–FHB. If relay 9–FHB is in its unoperated condition distributor common conductor 7–DC1 extends over the upper normally closed make-before-break contacts of relay 9–FHB, csonductor 904, armature No. 4 and front contact of relay 8–ST, conductor 801, resistor 10–MB3, through the upper winding of repeating relay 10–PT1, resistor 10–B1, to grounded positive battery. Should relay 9–FHB be in an operated condition the distributor common conductor 7–DC1 would extend over the lower armature and front contact of relay 9–FHB, conductors 905 and 906, resistor 10–MB5, through the upper winding of repeating relay 10–PT2, resistor 10–B2, to grounded positive battery. Twenty-five "code points" each representing a code character used in the private intercommunicating teletypewriter system, are connected in the correct combination to the grids of the five vacuum tubes. Each tube is a double triode operable from either of its two signal grids. For example, code letter "A" employs elements 1 and 2 of the teletypewriter code so code point "A" will be connected to a grid of each of vacuum tubes 5–VT1 and 5–VT2.

When all code points are open the grids of all the tubes are maintained at a negative potential of 48 volts with respect to ground. The cathodes of the tubes are maintained at a negative potential of 38 volts with respect to ground by means of a voltage divider across the negative 48-volt supply and resistors 5–R98 and 5–R102. This provides an effective negative bias of 10 volts on the grids of the tubes and none will be conducting normally. If a positive potential of 130 volts is applied to one of the code points a triode of the associated tube or tubes will become conducting. If point "A" is taken as an example, the left triode of each of tubes 5–VT1 and 5–VT2 will be in the conducting condition. If the distributor shaft of the reperforator-transmitter No. 1 is now rotated, current will flow in the plate circuit of the tubes during the time interval when distributor contacts Nos. 1 and 2 are made. This current will flow through the line winding of whichever polar repeating relay such as one of relays 10–PT1 and 10–PT2, is currently connected to the coding circuit, and cause the polar relay to transmit an "A" signal from its marking contacts for each revolution of the distributor shaft. Any of the twenty-five code characters may be produced in the same manner by applying positive 130 volts to the correct code point.

*Machine alarm circuit*

It is inherent to the operation of the machine alarm circuit that when signals are being transmitted by the polar telegraph relay (10–PT1 or 10–PT2) which drives its respective selector magnet (7–SEL or 11–SEL), the machine should be operated, that is, the transmitter shaft should be rotating. There are provided two contacts, a "make" and a "break" of a transfer spring combination, known as the "universal contacts" (7–U1) for reperforator-transmitter No. 1 and 11–U2 for reperforator-transmitter No. 2. One of these contacts is always grounded, a ground on the transfer spring being transferred from one contact to the other and back again during each rotation of the transmitter shaft. Failure of a machine to operate on signals is detected and translated into a condition of alarm by two circuits consisting of vacuum tube 6–VT6 and 6–VT7 and the resistance and condenser networks respectively associated with them. Vacuum tube 6–VT6 is assigned to reperforator-transmitter No. 1 and 6–VT7, to reperforator-transmitter No. 2. The two circuits are identical. Assume, for example, that the operation of the circuit begins with an idle condition and that the alarm for the reperforator-transmitter No. 1 will be considered. Polar telegraph repeating relay 10–PT1 will be in a marking condition, as shown, and conductor 7–US1 will be assumed to be currently grounded at universal contact 7–U1 of reperforator-transmitter No. 1. Since conductor 10–SA1 from the spacing contact of polar telegraph repeating relay 10–PT1 is open, negative potential of 48 volts will hold the grid of vacuum tube 6–VT6 by that amount with respect to the cathode which is grounded. Condensers 6–C1, 6–C2 and 6–C3 will also be charged to a 48-volt negative potential. If relay 10–PT1 starts to send signals but the transmitter shaft of reperforator-transmitter No. 1 does not rotate, a positive potential of 130 volts will be applied to conductor 10–SA1 during each spacing element of the signal. Within the transmitting time of three or four characters (at 75 speed signal transmission) a sufficient positive charge will have been built up in condenser 6–C1 to nullify the negative bias on the grids of vacuum tube 6–VT6 and vacuum tube 6–VT6 will become conducting. Relay 6–MA1 will be operated which will produce a conventional "state of alarm" in the circuit. If, when the signals appear in relay 10–PT1, the transmitter shaft starts to rotate, ground will be shifted from conductor 7–U81 to conductor 7–U91 before the positive potentials applied by the signals to conductor 10–SA1 can nullify the negative charge on the grids of the tube. This shift of ground will discharge condenser 6–C3 rapidly and condenser 6–C2 will start to acquire a negative charge. Eventually positive potential supplied by conductor 10–SA1 would again cause the vacuum tube 6–VT6 to conduct but before this can occur the ground will be shifted back to conductor 7–U81 by the rotation of the shaft. A steady repetition of this process prevents the vacuum tube 6–VT6 from conducting and operating relay 6–MA1.

DETAILED DESCRIPTION OF OPERATION

OPERATION OF AN AUTOMATICALLY ADDRESSED MESSAGE WITH A SINGLE ADDRESS

*Typing the message*

The dispatcher will type the message on the teletypewriter 2–TTY.

The line winding of the line relay 2–LR in the teletypewriter 2–TTY is normally energized and relay 2–LR is in its marking position as shown by a circuit extending from grounded positive battery, resistor 201, lower winding of line relay 2–LR, to the normally closed contacts of transmitting contacts 202, to ground. A marking current of .020 ampere will normally flow in the line winding of relay 2–LR and when any one of the transmitting contacts is closed during transmission. The biasing winding of line relay 2–LR has grounded positive 130 volts connected at one end of its energizing circuit and resistor 203 and ground at the other end. Resistances totalling 12,000 ohms internal to the teletypewriter permits a spacing bias current of .010 ampere to flow in the relay biasing winding. Line relay 2–LR in its normal, or marking position, maintains selector magnet 2–SEL of teletypewriter 2–TTY operated in an energized circuit extending from grounded positive battery of 130 volts, through the windings of selector magnet 2–SEL, resistor 204, marking contact and armature of relay 2–LR, resistor 205 to ground.

The operation of the teletypewriter keyboard operates transmitting contacts 202 and selector magnet 2–SEL operates accordingly to cause the message set-up on the keyboard to be copied. The operation of the teletypewriter keyboard will also operate repeating relay 10–PT1 provided the other relays in the address circuits are in their idle condition as shown, and the "copy only" control key 2–C is unoperated. The operating circuit for repeating relay 10–PT1 at this time is traceable from ground at the transmitting contacts 202, conductors 206 and 207, upper normally closed contacts of "copy only" control key 2–C, conductors 208 and 802, resistor 8–TMB, lower normally closed make-before break contacts of relay 8–TMA, conductor 803, normally closed make-before-break contacts of relay 8–ST, conductor 801, resistor 10–MB3, through the upper winding of relay 10–PT1, resistor 10–B1, to grounded positive 130-volt battery.

The polar telegraph repeating relays 10–PT1 and 10–PT2 will operate with a current of approximately .015 ampere in their respective operating, or upper, windings. This is a maximum current capacity of the plate circuits of the vacuum tubes 5–VT1 to 5–VT5, inclusive in the coding circuit. Biasing current is supplied to the lower windings of both repeating relays by a potentiometer arrangement comprising a grounded source of positive 130 volts and resistors 10–MB1 and 10–MB4 as shown in the drawing. When the upper winding of each repeating relay is closed in a circuit extending to ground (marking condition) the energizing current in the biasing winding is effectively zero. In actual operation when the upper winding of either of these relays is connected to grounded battery of positive potential of 130 volts as during a spacing impulse, current in the upper winding reverses and about .002 ampere flows in a spacing direction in the upper winding. When the upper winding is opened, current will, of course, be zero. For relay 10–PT1 this occurs during a spacing signal impulse from the teletypewriter keyboard or the coding circuit, and for relay 10–PT2 this occurs during a spacing impulse from the coding circuit or the transmitting circuit of reperforator-transmitter No. 1. During any spacing signal impulse the current in the biasing winding is approximately .010 ampere in a spacing direction. During a marking signal impulse this current is reversed and about .002 ampere flows in the biasing winding in the marking direction. Thus the operation of each relay is effectively polar and possesses stability against mechanical variation in the relay or normal variations in the plate current of the vacuum tubes in the coding circuit.

Repeating relay 10–PT1 upon operating, operates the selector magnet 7–SEL of reperforator-transmitter No. 1. The armature of repeating relay 10–PT1 is connected to a grounded source of positive 130 volts, through resistor 10–SA1. The marking, or left-hand, contact of repeating relay 10–PT1, which is normally closed to the armature, is connected over conductors 1001 and 1002, resistor 10–T1, conductor 7–T1, through the winding of selector magnet 7–SEL, to ground. Selector magnet 7–SEL operates on a current of approximately .020 ampere and follows the signal impulses repeated by repeating relay 10–PT1. Selector magnet 7–SEL upon operating in response to repeater signal impulses, will set up the message in teletypewriter code on the tape in reperforator-transmitter No. 1. The appearance of message tape in the reperforator-transmitter No. 1 will close its transmitter-stop contact 7–TS1. The closure of the transmitter-stop contact 7–TS1 closes a circuit extending from ground connection 702, conductor 7–TS1′, normally closed contact of transmitter-stop key 6–TS1, conductor 601, innermost lower armature and back contact of relay 6–MA1, conductor 602, innermost lower armature and back contact of relay 6–TO1, conductor 603, armature No. 4 and back contact of switching relay 10–SW, conductor 920, armature No. 4 and back contact of relay 8–END, back contact and innermost upper armature of relay 8–LK, lower armature and back contact of relay 8–MB, conductor 8–KCG, upper normally closed contacts of key 2–MA, an operated one of automatic address keys 2–AA1 to 2–AA10, through the upper winding of its respective selector relay of relays 2–AA1′ to 2–AA10′, to grounded source of negative potential of 48 volts. Ground 702 obtained at the closure of transmitter-stop contacts 7–TS1 and connected to the circuit just traced, conditions the dispatcher's control keys for operation.

*Dispatching the message*

After the message has been typed, the dispatcher will select and operate the correct "automatic address key," that is, any one of keys 2–AA1 to 2–AA10. The operation of this key will close the circuit of the upper winding of the corresponding relay of relays 2–AA1′ to 2–AA10′ and the corresponding relay will operate.

It is assumed that key 2–AA1 is operated to operate relay 2–AA1′. Contact points Nos. 4 and 5, 7 and 8, 10 and 11, 13 and 14, and 16 and 17 of bank No. 5 of the selector switch are connected to their respective coding points in the vacuum tube coding circuits and are paired to represent two-letter signal combinations for each address. Contact points 4 and 5 are connected to conductors 1A and 1B. Contact points 7 and 8 are connected to conductors 2A and 2B. Contact points 10 and 11 are connected to conductors 3A and 3B. Contact points Nos. 13 and 14 are connected to conductors 4A and 4B. Contact points Nos. 16 and 17 are connected to conductors 5A and 5B. A set of one or more conductor pairs is provided for each of relays 2–AA1′ to 2–AA10′ and each of relays 2–AA1′ to 2–AA10′ when operated, connects each conductor pair to two different coding conductors, each serving to select a distinctive letter signal combination. For example, when relay 2–AA1′ operates, conductors 1A and 1B respectively select two predetermined signal combinations, for example, those combinations representing letters B and C, respectively. In like manner, conductors 2A and 2B respectively select signal combinations for, say, letters F and I, respectively; conductors 3A and 3B respectively select signal combinations for, say, letters A and Q; conductors 4A and 4B selectively select signal combinations for, say, letters D and W; and conductors 5A and 5B selectively select signal combinations for, say, letters G and X. In like manner each of the others of relays 2–AA1′ to 2–AA10′ selects one or more pairs of signal combinations of the same or other letters providing no two combinations of letters are alike. The five pairs of signal combinations of any one of relays 2–AA1′ to 2–AA10′ are selected, in turn, as the brush advances over the contacts of banks No. 5 of the selector switch. If, for example, a single address message with code address BC is assumed to be selected in response to the operation of automatic address key 2–AA1, only one pair of conductors, preferably conductors 1A and 1B, would be connected over the corresponding armatures, say armatures Nos. 1 and 2 of relay 2–AA1′, to conductors B and C, respectively, of the vacuum tube coding circuit. From one to five addresses may be set up on each of the ten automatic address keys in this manner. The cross-connections of the armatures of each of relays 2–AA1′ to 2–AA10′ to the letter conductors A, B, C, and so forth, may be changed from time to time, as desired.

Each of relays 2–AA1′ to 2–AA10′, when operated, connects conductor 815 over a front contact and No. 8 armature of the operated relay to its respective conductor of conductors 2–CT1 to 2–CT10. Contacts Nos. 6, 9, 12 and 15 on bank No. 4 of the selector switch are used as "code terminating" contacts and may be connected to any of the conductors 2–CT1 to 2–CT10 depending on the number of addresses in the group that is selected by the operated relay of relays 2–AA1′ to 2–AA10′. If it is assumed that a single address message is to be selected by the operation of automatic address key No. 2–AA1, conductor 2–CT1 should be cross-connected as shown by a dash line, to contact No. 6 on bank No. 4 of the selector switch. Termination of two, three and four addresses for each automatic address key may be set up by connecting the conductor 2–CT corresponding to the key and relay operated to contacts Nos. 9, 12 and 15, respectively, on bank No. 4. Messages with five addresses require no code termination connection at contact bank No. 4, the bank No. 4 on selector switch being, in this event, shunted.

The operating circuit for the operated relay of relays 2–AA1′ to 2–AA10′ is traceable from grounded battery, through the upper winding of the relay, the alternate contact of the operated key of keys 2–AA1 to 2–AA10, lower normally closed contacts on key 2–MA, conductor 8–KCG, lower armature and back contact of relay 8–MB, innermost upper armature and back contact of relay 8–LK, back contact and armature No. 4 of relay 8–END, conductor 920, back contact and armature No. 4 of relay 10–SW, conductor 603, back contact and innermost lower armature of relay 6–TO1, conductor 602, back contact and innermost lower armature of relay 6–MA1, conductor 601, normally closed contact of transmitter-stop key 6–TS1, conductor 7–TS1′, transmitter-stop contacts 7–TS1, to ground connection 702 and the selected relay of relays 2–AA1′ to 2–AA10′ operates. Contacts 7–TS1 are closed by well-known mechanical means when tape is in the transmitter of reperforator-transmitter No. 1.

The operated relay of relays 2–AA1′ to 2–AA10′ locks in a circuit extending over its lower winding, front contact and armature No. 7, conductors 812 and 813, through the winding of relay 8–LK, to ground at the back contact and armature No. 5 of relay 8–END. Relay 8–LK operates and thereby initiates the following sequence of operations: (1) disables all the dispatcher's control keys by opening at its innermost upper armature and back contact the conditioning circuit for such keys; (2) prepares at its middle upper armature and front contact a locking circuit for relay 8–END; (3) closes at its outermost upper armature and front contact an operating circuit for start relay 8–ST; (4) maintains at its inner lower armature and front contact a locking circuit for relay 9–TW should the latter relay be in an operating condition at this time; and (5) closes at its outer lower armature and front contact an energizing circuit for lamp 2–W, the circuit being traceable over conductors 818 and 819, through lamp 2–W, to grounded source of negative potential of 48 volts whereby lamp 2–W lights to indicate to the dispatcher that a message is being processed and that it will be impossible to dispatch another message until lamp 2–W becomes extinguished.

Relay 8–ST upon operating, (1) connects at its No. 4 armature and front contact, conductor 801 to conductor 904 whereby the operating winding of repeating relay 10–PT1 is connected to distributor contacts 701 of reperforator-transmitter No. 1 to condition reperforator-transmitter No. 1 for the reception of the end-of-message signal consisting of "Figures," "H" and "Letters" code signal combinations which will be recorded on the reperforator-transmitter No. 1 tape immediately following the message as will be hereinafter described; (2) disables the teletypewriter keyboard by applying ground in shunt to the ground connected to transmitting contacts 202 of the dispatcher's teletypewriter, the shunting ground being connected over the middle upper armature and back contact of relay 9–FHB, conductor 908, armature No. 5 and front contact of relay 8–ST, conductor 820 to the point of connection where conductor 820 joins conductor 208; (3) prepares at its armature No. 7 and front contact a locking circuit for relay 8–END; (4) connects at its No. 2 armature and front contact a grounded source of positive potential of 130 volts to the brush of bank No. 5 of the coding selector switch, the circuit extending over resistor 8–CDS and conductor 821 whereby the brush of bank No. 5 when stepped to its terminal No. 1, as will be hereinafter described, extends the circuit over conductor 401 to the "Figures" code point of the coding circuit shown in Fig. 3, and a "Figures" signal combination is transmitted over the distributor contacts 701 when the distributor shaft of the reperforator-transmitter No. 1 rotates as hereinbefore described in connection with the electron vacuum tube coding circuit under the general description; (5) closes at its No. 1 armature and front contact a circuit extending from ground at the back contact and No. 5 armature of relay 9–FHR, conductor 910, No. 1 armature and front contact of relay 8–ST, conductor 822 through the winding of switching relay 10–SW, to grounded source of negative potential of 48 volts and relay 10–SW operates; (6) prepares at its No. 3 armature and front contact a circuit extending from a grounded source of negative potential of 48 volts, through the winding of relay 8–SS, conductor 823, front contact and armature No. 3 of relay 8–ST, conductor 824, back contact and armature No. 6 of relay 9–FHR, conductor 7–DA1′ to the distributor auxiliary contacts 7–DA1 of reperforator-transmitter No. 1, contacts 7–DA1 being arranged to automatically close when the distributor shaft of reperforator-transmitter No. 1 rotates; (7) disconnects, at its No. 6 armature and back contact, ground from conductor 837 in the operating circuit of normally operated relay 9–DM and relay 9–DM at this time releases.

Switching relay 10–SW, upon operating, (1) connects the five distributor contact conductors 7–D11, 7–D21, 7–D31, 7–D41, 7–D51 of reperforator-transmitter No. 1 to the plate circuits of vacuum tubes 5–VT1 to 5–VT5, respectively, of the coding circuit, the circuits being prepared at the front contacts of armatures Nos. 2, 3, 5, 6 and 7, respectively, of switching relay 10–SW; (2) opens at its No. 4 armature and back contact the circuit hereinbefore traced extending from transmitter-stop contacts 7–TS1 which close by mechanical means when tape is present in reperforator-transmitter No. 1 and which serve to condition the dispatcher's control keys, but the circuit so opened further disables them at this time; (3) prepares at its No. 1 armature and front contact an operating circuit for the distributor clutch release magnet 7–DIST of reperforator-transmitter No. 1, the circuit being traceable from grounded source of negative potential of 48 volts, through the winding of distributor magnet 7–DIST, conductors 703 and 7–DM1, lower armature and back contact of relay 9–SSA, back contact and outer lower armature of relay 9–FHA, conductor 911, armature and back contact of slow-release relay 9–DM, conductor 912, to ground at the front contact and armature No. 1 of relay 10–SW.

Relay 9–DM is of the slow-acting type having a release time of about 200 milliseconds. This delays the start of the distributor shaft of reperforator-transmitter No. 1 until it is certain that the last signal combination of the message has reached the tape in reperforator-transmitter No. 1 or that the last address signal combination has reached the tape in the reperforator-transmitter No. 2 and the address coding and relay circuit is ready to transmit the "end-of-message" code from the coding circuit to the tape in the retransmitter-perforator No. 1.

Relay 9–DM, upon releasing, completes the circuit just traced for operating distributor clutch release magnet 7–DIST and the magnet 7–DIST operates.

Figure 3:
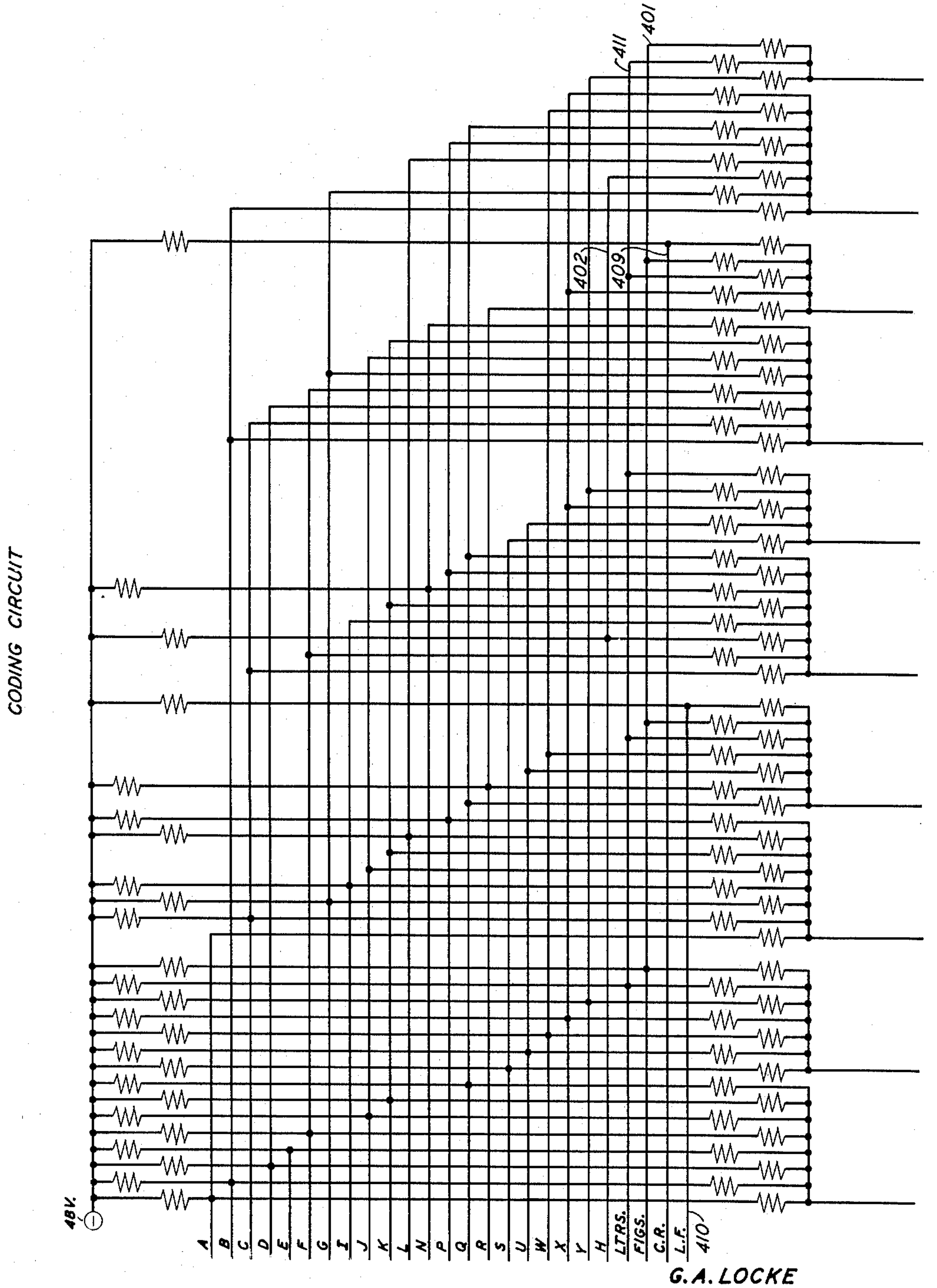
Figs. 3, 4 and 5 show the coding circuit whereby the address codes of desired predetermined groups of receiving printers are selected by corresponding automatic message call keys.
Figure 4:
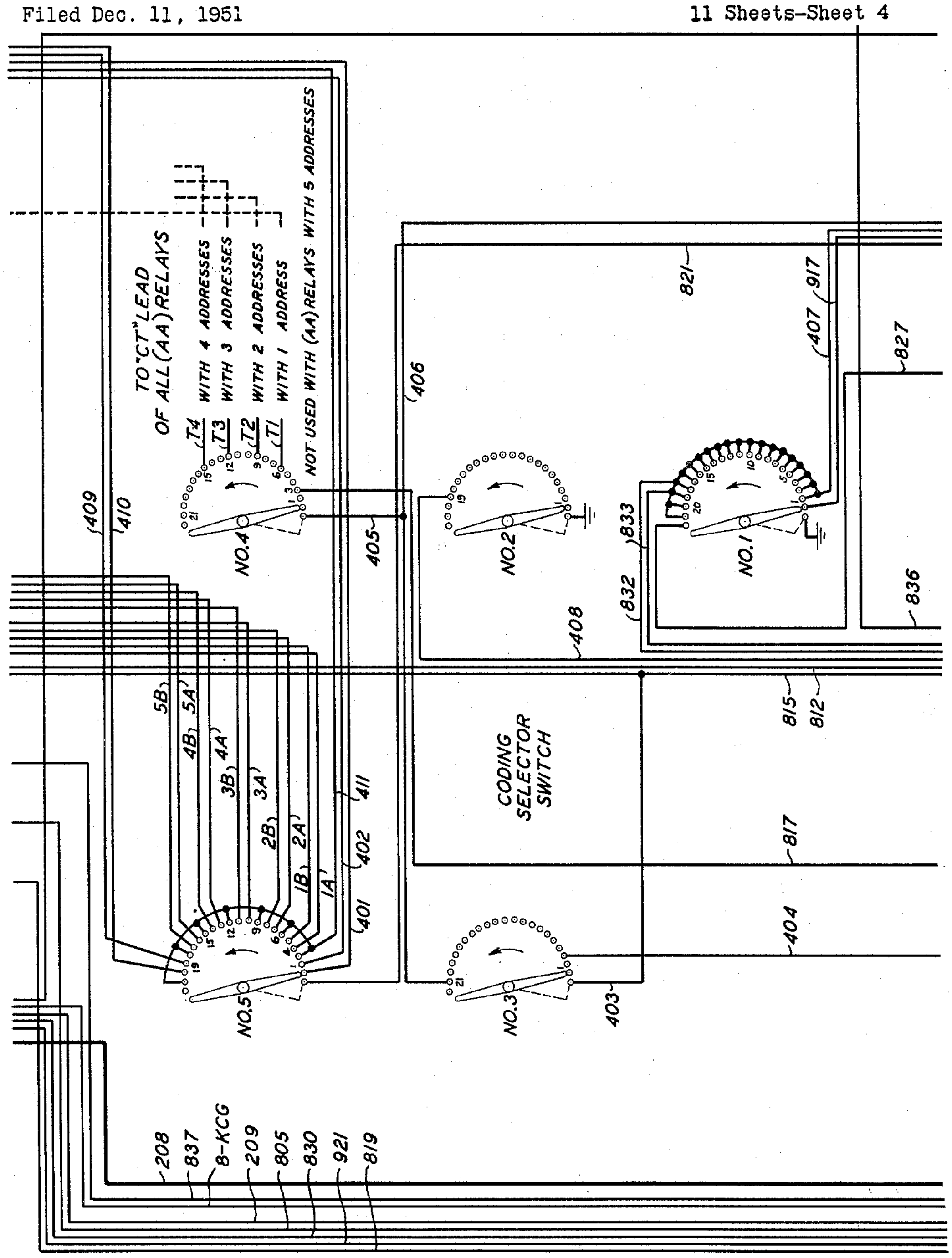
Figure 5:
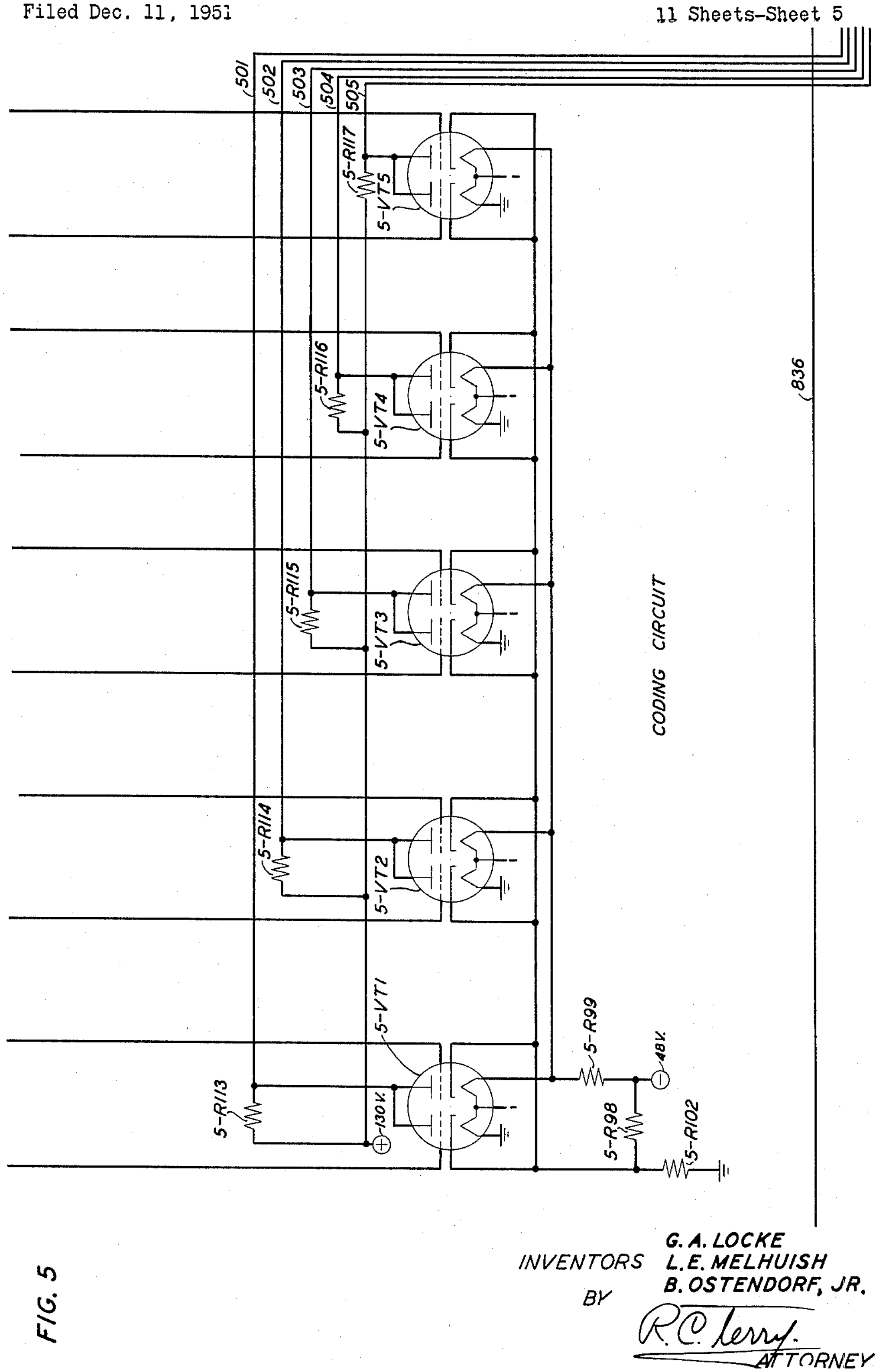

The distributor shaft of reperforator-transmitter No. 1 now starts rotating and the coding circuit will cause relay 10–PT1 to automatically transmit the "end-of-message" signal to the tape. The coding selector switch comprising contact banks Nos. 1 to 5, inclusive, is at this time, as hereinbefore stated, in the position shown in Fig. 4 wherein the five brushes are on their respective No. 1 terminals and conductor 401 which is connected to terminal No. 1 on bank No. 5 is cross-connected to the grid of right-hand triode of each of vacuum tubes 5–VT1, 5–VT2, 5–VT4 and 5–VT5, inclusive, as shown in Fig. 3. This cross-connection of conductor 401 sets up the "Figures" signal combination, and transmits it to the reperforator-transmitter No. 1 where it will be recorded immediately following the last character of the message on the perforator tape. The right-hand triode of each of vacuum tubes 5–VT1, 5–VT2, 5–VT4 and 5–VT5 will in response to this positive potential received from the source at the No. 2 armature and front contact of relay 8–ST, conduct and cause current to flow in the plate circuit of these four conducting tubes. The energized plate circuits respectively comprising conductors 501, 502, 504 and 505 are extended over the front contacts of switching relay 10–SW to conductors 7–D11, 7–D21, 7–D41 and 7–D51 to contacts Nos. 1, 2, 4 and 5 of distributor contacts 701 and each of contacts Nos. 1, 2, 4 and 5 will transmit in turn a marking impulse over a path traceable over conductor 7–DC1, upper normally closed make-before-break contacts of relay 9–FHB, conductor 904, armature No. 4 and front contact of start relay 8–ST, conductor 801, resistor 10–MB3, through the upper winding of repeating relay 10–PT1, resistor 10–B1, to grounded source of positive potential of 130 volts.

As the distributor shaft at reperforator-transmitter No. 1 rotates the distributor auxiliary contacts 7–DA1 close and thereby connect ground 701 to conductor 7–DA1′ in a circuit traceable over armature No. 6 and back contact of relay 9–FHR, conductor 824, armature No. 3 and front contact of relay 8–ST, conductor 823, through the winding of relay 8–SS, to grounded source of negative potential of 48 volts and relay 8–SS operates. When the distributor completes its revolution, contacts 7–DA1 open to thereby release relay 8–SS.

Relay 8–SS upon operating, closes at its upper armature and front contact an operating circuit for stepping magnet 8–STEP which operates. The operation of stepping magnet 8–STEP of the selector switch will prepare to advance the brushes on all the banks of the switch one step, but will not do so until the release of the magnet immediately following the release of relay 8–SS. The distributor shaft in rotating through one revolution at this time transmits by means of distributor contacts 701 the "Figures" signal combination to repeating relay 10–PT1 which, in turn, repeats the signal combination to selector magnet 7–SEL to perforate the signal in the tape of reperforator-transmitter No. 1. Therefore, relay 8–SS upon releasing, releases the stepping magnet 8–STEP which then advances the switch to terminal No. 2. At terminal No. 2 on bank No. 5 of the selector switch the positive potential from the grounded source of 130 volts at armature No. 2 and front contact of relay 8–ST is connected over conductor 821, terminal No. 2 of bank No. 5, conductor 402 which is cross-connected to the grids of the left-hand triodes of vacuum tubes 5–VT3 and 5–VT5 in accordance with the signal code combination for letter "H." Vacuum tubes 5–VT3 and 5VT5 now conduct and the rotation of the distributor shaft of reperforator-transmitter No. 1 during the next revolution repeats the cycle of operation just described for "Figures" signal combination except that an "H" signal combination will be perforated on the tape in reperforator-transmitter No. 1. The cycle will again take place and a "Letters" signal combination will be added to the tape with the brushes of the selector switch on terminal No. 3 on the five contact banks, respectively.

When distributor auxiliary contacts 7–DA1 close during this cycle, that is, when the brushes of the selector switch banks are on their respective terminals No. 3, the ground on the lower armature and front contact of relay 8–SS is connected to a circuit traceable over conductors 814, 815 and 403, brush and terminal No. 3 of bank No. 3, conductor 404, through the winding of relay 9–FHA, to a source of negative potential of 48 volts and relay 9–FHA operates.

Relay 9–FHA upon operating, (1) prepares at its upper armature and front contact a locking circuit for relay 8–END, the circuit being traceable from grounded source of negative potential of 48 volts, through the winding of and over the armature No. 2 and front contact of relay 8–END, conductors 826 and 825, to ground at the upper armature of relay 9–FHA; (2) prepares at its inner lower armature and front contact a locking circuit for itself extending over conductor 913, through the winding of relay 9–FHB, conductor 914, to ground at its armature No. 7 and back contact of relay 8–END; and (3) opens at its outer lower armature and back contact the operating circuit for distributor clutch release magnet 7–DIST, the circuit being traceable from ground at armature No. 1 and front contact of relay 10–SW, conductor 912, back contact and armature of relay 9–DM, conductor 911, outer lower armature and back contact of relay 9–FHA, back contact and lower armature of relay 9–SSA which at this time is also operated, conductor 7–DM1, conductor 703, through the winding of distributor magnet 7–DIST, to grounded source of negative potential of 48 volts.

Because of the operated condition of relays 9–FHA and 9–SSA the distributor shaft of reperforator-transmitter No. 1 will stop rotating when it completes its revolution for transmitting the "Letters" signal combination. When this occurs the distributor common conductor 7–DC1 will be connected to ground in a circuit traceable through resistor 6–DCG, conductors 604 and 704, stop contact of distributor contacts 701, conductor 7–DC1, upper normally closed make-before-break contacts of relay 9–FHB, conductor 904, No. 4 armature and front contact of relay 8–ST, conductor 801, resistor 10–MB3, through the upper winding of repeating relay 10–PT1, resistor 10–B1, to grounded source of positive potential of 130 volts. In this circuit relay 10–PT1 will be maintained operated in a marking position until the next circuit function is indicated.

Relay 9–SSA upon operating, (1) prepares at its inner upper armature and front contact a locking circuit for relay 8–END, the circuit being traceable over conductors 825 and 826, front contact and armature No. 2 and winding of relay 8–END, to the grounded source of negative potential of 48 volts; (2) prepares at its outer upper armature and front contact a locking circuit for itself and this circuit extends through the winding of relay 9–SSB, conductor 915, armature and back contact of relay 8–ULK, conductor 914, to ground at the back contact and outermost lower armature of relay 8–END; and (3) opens at its lower armature and back contact a second point in the operating circuit for distributor clutch release magnet 7–DIST. This circuit was previously opened at the outer lower armature and back contact of relay 9–FHA which at this time is also in an operated position.

When the distributor auxiliary contacts 7–DA1 open at the end of the "Letters" signal combination, ground will be disconnected from conductor 7–DA1′ and relays 9–FHB and 9–SSB will be operated through the locking paths of relays 9–FHA and 9–SSA, respectively, by the loss of ground at relay 8–SS which now releases when the distributor auxiliary contacts 7–DA1 open. The ground at the lower armature and front contact of relay 8–SS when relay 8–SS was operated, shunted the locking circuit for relays 9–FHA and 9–SSA. Relay 9–FHB upon operating, (1) shifts the distributor common conductor 7–DC1 which is connected to the normally closed stop contact of the distributor contacts 701 of reperforator-transmitter No. 1 from the winding of repeating relay 10–PT1 to the winding of repeating relay 10–PT2, the shift being effected by opening the upper normally closed make-before-break contacts of relay 9–FHB and closing the lower armature and front contact; (2) shifts at its innermost upper armature and front contact the line winding of repeating relay 10–PT1 back to the teletypewriter keyboard; (3) removes at its middle upper armature and back contact the ground which shunted the ground at the teletypewriter keyboard transmitting contacts 202 from the winding of repeating relay 10–PT1, the teletypewriter keyboard circuit now being traceable over conductors 206, 207, 208, and 802, resistor 8–TMB, lower normally closed make-before-break contacts of relay 8–TMA conductor 803, innermost upper armature and front contact of relay 9–FHB, conductor 904, No. 4 armature and front contact of relay 8–ST, conductor 801, to the winding of relay 10–PT1. The teletypewriter keyboard is now capable of operating repeating relay 10–PT1; and (4) closes at its outermost upper armature and front contact a point in the operating circuit of distributor clutch release magnet 7–DIST, which circuit is now opened due to the operated condition of relay 9–SSA and distributor clutch release magnet 7–DIST does not operate at this time. Relay 9–SSB upon operating, (1) closes at its upper armature and front contact a circuit traceable from ground at the brush and No. 3, contact of bank No 1 of the selector switch, conductor 407, upper armature and front contact of relay 9–SSB, conductors 916 and 827, back contact and armature of stepping magnet 8–STEP, through the winding of stepping relay 8–SS, grounded source of negative potential of 48 volts, to operate relay 8–SS and in turn to operate and release stepping magnet 8–STEP as herebefore described; and (2) prepares at its lower armature and front contact a path which will be closed when the selector switch completes a cycle and the brushes thereof again engage their respective contacts Nos. 1, the path when completed will be traceable from grounded source of negative potential of 48 volts, through the winding of relay 9–FHR, front contact of lower armature of relay 9–SSB, conductor 917, No. 1 contact engaged by the brush on the No. 1 bank, to ground.

The ground supplied at contact No. 3 of bank No. 1 is connected to conductor 407 and causes relay 8–SS and the stepping magnet 8–STEP to automatically operate and release in a manner as herebefore described, to move the brushes on the selector banks to their respective contacts No. 4. The distributor shaft of the reperforator-transmitter No. 1 will start to rotate when the selector switch brush engages contact No. 4 on bank No. 5. Continuing to use the example of a single address message with the code address BC on automatic address relay 2–AA1, the grounded source of positive potential of 130 volts on armature No. 2 and front contact of relay 8–ST is impressed on a circuit traceable over conductor 821, brush on contact No. 4 of bank No. 5 of the selector switch, conductor 1–A, contact and armature No. 1 of relay 2–AA1, to conductor B of the vacuum tube coding circuit and this positive potential is also impressed on the grids of the left triode of each of vacuum tubes 5–VT1, 5–VT4 and 5–VT5 whereby plate current is made available on each of conductors 501, 504 and 505. These currents flow from the grounded source of positive potential of 130 volts, through the upper winding of repeating relay 10–PT2, conductors 906 and 905, front contact and lower armature of relay 9–FHB, conductor 7–DC1, contacts Nos. 1, 4 and 5, respectively, of distributor contacts 701, to conductors 501, 504 and 505. These plate current impulses are repeated by repeating relay 10–PT2, to selector magnet 11–SEL of reperforator-transmitter No. 2 and the code signal for letter B will be set up upon the tape in the reperforator-transmitter No. 2. In like manner, when the brush steps to contact No. 5 of bank No. 5 of the selector switch the positive potential received over conductor 1–B, front contact and armature No. 2 of relay 2–AA1 by conductor C of the vacuum tube coding circuit, is impressed on the grids of the left-hand triodes of vacuum tubes 5–VT2, 5–VT3 and 5–VT4 whereby plate current flows to conductors 502, 503 and 504 from contacts Nos. 2, 3 and 4 of distributor contact 701 of the reperforator-transmitter No. 1, distributor common conductor 7–DC1, and through the winding of repeating relay 10–PT2. These plate current impulses are likewise repeated by repeating relay 10–PT2 to selector magnet 11–SEL of reperforator-transmitter No. 2 and the signal combination for the letter C will be recorded on the tape of reperforator-transmitter No. 2. In like manner, the signal combination for "Letters" will be perforated in the tape of reperforator-transmitter No. 2 when the brush advances to contact No. 6 of bank No. 5 of the selector switch.

The ground supplied at contact No. 6 of bank No. 1 will be connected to conductor 407 and this ground will cause relay 8–SS and stepping magnet 8–STEP to automatically operate and release repeatedly in a manner as hereinbefore described, until the brushes on the selector banks reach their respective contacts Nos. 19. During this time another message may be typed on the keyboard and set up on the tape in the reperforator-transmitter No. 1. This message may not be dispatched or manually addressed at this time as indicated by the lighted condition of lamp 2W and the disabled condition of the dispatching keys, and the failure to light lamp 2T if manual address key 2–MA is operated.

At contact No. 19 on bank No. 2 of the selector switch, ground is connected to close a circuit traceable over conductor 408, innermost upper armature and back contact of relay 8–LCL, conductor 828, innermost upper armature and back contact of relay 8–CAN, through the winding of relay 8–ULK, grounded source of negative potential of 48 volts and relay 8–ULK operates. At contact No. 19 on bank No. 5, a grounded source of positive potential of 130 volts will be applied over the No. 2 armature and front contact of relay 8–ST, conductor 821, brush and contact No. 19 of switch bank No. 5, conductor 409, to the "carriage return" code point of the vacuum coding circuit shown in Fig. 3. The single combination for the "carriage return" signal is space, space, space, mark, space, and therefore the positive potential is applied to the grid of the right-hand triode of vacuum tube 5–VT4 only. Vacuum tube 5–VT4 starts conducting in a circuit traceable over conductor 504, front contact and armature No. 6 of switching relay 10–SW, conductor 7–D41, to contact No. 4 of distributor contacts 701 of reperforator-transmitter No. 1. The distributor shaft of this machine starts rotating as a result of relay 8–ULK operating as hereinafter described.

Relay 8–ULK upon operating, opens at its armature and back contact a locking circuit for relay 9–SSA and the operating circuit for relay 9–SSB and both relays 9–SSA and 9–SSB release. Relay 9–SSA upon release (1) closes at its lower armature and back contact and operating circuit for distributor clutch release magnet 7–DIST, the circuit extending over conductor 7–DM1, lower armature and back contact of relay 9–SSA, outer upper armature of front contact of relay 9–FHB, conductor 911, armature of back contact of relay 9–DM, grounded conductor 912, and magnet 7–DIST operates; and (2) opens at its inner upper armature and front contact the locking circuit for relay 8–END which is of no effect at this time inasmuch as relay 8–END is unoperated. Relay 8–SSB upon releasing, (1) opens on its lower armature and front contact the operating circuit of relay 9–FHR which also is of no effect at this time inasmuch as relay 9–FHR is unoperated, and (2) opens at its upper armature and front contact the operating circuit of relay 8–SS whereby the brushes of the selector switch stop on their respective contacts Nos. 19.

When the distributor shaft of reperforator-transmitter No. 1 starts rotating in response to the operation of magnet 7–DIST as hereinbefore described distributor contacts 701 transmit the "carriage return" signal over conductor 7–DC1, lower armature and front contact of relay 9–FHB, conductors 905 and 906, resistor 10–MB5, through the upper winding of repeater relay 10–PT2, resistor 10–B2, to the grounded source of positive potential of 130 volts. Repeater relay 10–PT2 follows the signal impulses of the "carriage return" signal and repeats them to the selector magnet 11–SEL of the reperforator-transmitter No. 2 wherein the "carriage return" signal is recorded immediately after the last character of the last code address which was previously set up on the tape of this machine.

Also at the time when the distributor shaft of reperforator-transmitter No. 1 starts rotating it closes its distributor auxiliary contacts 7–DA1 to close an operating circuit for relay 8–SS, the circuit, as hereinbefore described, being traceable over conductor 7–DA1, No. 6 armature of back contact of relay 9–FHR, conductor 824, contact No. 3 and front armature of relay 8–ST, conductor 823, through the winding of relay 8–SS, to the grounded source of negative potential of 48 volts and relay 8–SS operates, and, in turn, operates stepping magnet 8–STEP. Relay 8–SS and stepping magnet 8-STEP automatically operate and release as herebefore described to step the selector switch brushes to contacts Nos. 20. Selector switch brushes upon leaving their respective contacts Nos. 19, open the operating circuit for relay 8–ULK which now releases. Relay 8–ULK upon releasing, closes at its armature and back contact a point in the locking path for the next operation of relays 9–SSB and 9–SSA.

When the selector switch brushes move into engagement with their respective No. 20 contacts a circuit is closed from grounded source of positive potential at the No. 2 armature and front contact of relay 8–ST, conductor 821, brush on No. 20 contact of bank No. 5 of the selector switch, conductor 410, to the line feed code point of the vacuum tube coding circuit. The code combination for the "Line Feed" signal is space, mark, space, space and space, and therefore the grounded source of positive potential applied to conductor 410 is impressed on the grid of the right-hand triode of vacuum tube 5–VT2 only. Plate current is now available in the circuit extending over conductor 502, front contact and No. 3 armature of switching relay 10–SW, conductor 7–D21, to the No. 2 contact of the distributor contacts 701 of the reperforator-transmitter No. 1. Inasmuch as the relay 9–SSA is still released, the operating circuit for the distributor clutch release magnet 11–DIST is still closed and the distributor shaft continues to rotate and transmits the Line Feed signal to the winding of repeating relay 10–PT2. Repeater relay 10–PT2 repeats the signal to selector magnet 11–SEL and the Line Feed signal is recorded immediately after the "carriage return" signal on the tape of reperforator-transmitter No. 2.

When the distributor shaft of reperforator-transmitter No. 1 begins to rotate, district auxiliary contacts 7–DA1 close and ground is thereby connected to the circuit extending over conductor 7–DA1′, armature No. 6 of back contact of relay 9–FHR, conductor 824, armature No. 3 and front contact of relay 8–ST, conductor 823, through the winding of relay 8–SS, to a grounded source of negative potential of 48 volts. Relay 8–SS operates to cause the operation of stepping magnet 8–STEP. The selector switch now steps to contact No. 21 and in this position of the switch grounded source of positive potential of 130 volts is impressed over armature No. 2 and front contact of relay 8–ST, selector 821, brush on contact No. 21 of bank No. 5 of the selector switch, conductors 412 and 411 to the "Letters" code point of the vacuum tube coding circuit. The code combination for the "Letters" signal is mark, mark, mark, mark, mark. Therefore, the grounded positive potential on conductor 411 is impressed on the grid of the right-hand triode of each of vacuum tubes 5–VT1 to 5–VT5 to cause a plate current to be available on each of conductors 501 to 505 to their respectively associated operated contacts of relay 10–SW and contacts Nos. 1, 2, 3, 4 and 5 of the distributor contact 701 of reperforator-transmitter No. 1. Inasmuch as distributor clutch release magnet 7–DIST is still held operated the rotatable shaft of reperforator-transmitter No. 1 continues to rotate and the five marking impulses set up by distributor contact 701 are repeated through repeating relay 10–PT2, to the selector magnet 11–SEL whereby the "Letters" signal is recorded immediately after the "Line Feed" signal on the tape of reperforator-transmitter No. 2.

When the distributor auxiliary contacts 7–DA2 close during the rotation of the distributor shaft for the transmission of the "Letters" signal, the operating circuit for relay 8–SS is again closed and then opened to cause the operation and release of stepping magnet 8–STEP. When relay 8–SS operates, it closes at its lower armature and front contact, a circuit traceable over conductors 814, 815 and 403, brush on No. 21 contact of bank No. 3 of the selector switch, conductor 406, through the winding of relay 9–SSA, to grounded source of negative potential of 48 volts whereby relay 9–SSA operates. When distributor auxiliary contacts 7–DA1 open at the end of the distributor shaft revolution, the shunting ground on the operating circuit of relay 8–SS is removed whereby relay 8–SS releases to remove ground at its lower armature and front contact from the operating circuit for relay 9–SSA. However, relay 9–SSA is held operated by its locking circuit which extends over its outer upper armature and front contact, through the winding of relay 9–SSB, conductor 915, lower armature and back contact of relay 8–ULK, back contact and outermost lower armature of relay 8–END, to ground. Relay 9–SSB operates at this time.

The operation and release of stepping magnet 8–STEP will cause the selector switch to step to contact No. 22 where ground on the brush on contact bank No. 1 is applied to the off-normal, or back, contact and armature of stepping magnet 8–STEP to again cause the operation and release of each of stepping relay 8–SS and stepping magnet 8–STEP. The selector switch brushes will step once more and come to rest on their respective contacts No. 1. This completes the cycle of operation of the selector switch and it will remain on contact No. 1, the idle position, until another message is dispatched. Since relay 9–SSB is operated at this time, a circuit is closed from grounded source of negative potential of 48 volts, through the winding of relay, 9–FHR, front contact and lower armature of relay 9–SSB, conductor 917, contact No. 1 and brush of contact No. 1 of bank No. 1 of the selector switch and relay 9–FHR operates.

Relay 9–FHR upon operating, (1) shifts at its No. 6 armature conductor 7–DA1 which extends to the distributor auxiliary contacts 7–DA1 on reperforator-transmitter No. 1, from the winding of stepping relay 8–SS to the winding of relay FHC; (2) prepares at its No. 1 armature and front contact a circuit traceable from the grounded source of negative potential of 48 volts, through the winding of transmitter clutch release magnet 7–TRANS, conductor 7–TM1, back contact and upper armature of relay 9–TM, conductor 918, armature No. 1 of front contact of relay 9–FHR, conductors 919 and 920, back contact and armature No. 4 of switching relay 10–SW, conductor 603, back contact and innermost lower armature of relay 6–TO1, conductor 602, back contact of innermost lower armature of relay 6–MA1, conductor 601, normally closed contacts at the transmitter-stop key 6–TS1, conductor 7–TS1′, to the transmitter-stop contacts 7–TS1, to ground; (3) prepares at its No. 7 armature and contact a locking circuit for relay 9–TM, 9–FH and 9–FHL; (4) connects conductor 7–FG1, 7–H1 and 7–LT1 from the reading fan contacts of reperforator-transmitter No. 1 to a reading circuit consisting of relays 9–FG, 9–FH, 9–TM, 9–FHL and 9–FHC; and (5) opens at its No. 5 armature and back contact the operating circuit for relay 10–SW which now releases.

Switching relay 10–SW, upon releasing, (1) connects the sensing contacts of the reperforator-transmitter No. 1 to the distributor contacts of the same machine, which is the condition for transmitting from the tape of the machine to repeating relay 10–PT2, the sensing contacts 1a to 5a serving to transmit the character signal combinations through the distributor contacts 701 and the remaining contacts which are controlled by the sensing contacts serving to detect or decode certain code signal combinations in a decoding fan circuit for control purposes, as will be described; (2) completes at its No. 4 armature and back contact an operating circuit for the transmitter clutch release magnet 7–TRANS of reperforator-transmitter No. 1, the circuit being traceable from grounded source of negative potential of 48 volts, through the winding of the transmitter clutch release magnet 7–TRANS, conductor 7–TM1, back contact and upper armature of relay 9–TM, conductor 918, armature No. 1 and front contact of relay 9–FHR, conductors 919 and 920, back contact and armature No. 4 of switching relay 10–SW, conductor 603, back contact of innermost lower armature of relay 6–TO1, conductor 602, back contact of innermost lower armature of relay 6–MA1, conductor 601, normally closed contact of transmitter-stop key 6–TS1, conductor 7–TS1′, transmitter-stop contact 7–TS1 in closed condition, to ground, thereby operating the transmitter clutch release magnet 7–TRANS, to start the reperforator-transmitter No. 1 transmitting from its own tape; (3) maintains open at its No. 1 armature and front contact the operating circuit for the distributor clutch release magnet 7–DIST while transmission is controlled by the transmitter clutch release magnet 7–TRANS.

The message on the tape in reperforator-transmitter No. 1 will now be transmitted to the tape in reperforator-transmitter No. 2. At the end of the message the "end-of-message" code consisting of code signals for "Figures," "H," and "Letters" in succession will pass through the reading fan of the reperforator-transmitter No. 1, which will apply ground to their respective character signal fan conductors 7–FG1, 7–H1 and 7–LT1. When ground is applied to conductor 7–FG1, relay 9FG operates, circuit being traceable from grounded source of negative potential of 48 volts, to the upper winding of relay 9FG, armature No. 2 and front contact of relay 9–FHR, conductor 7–FG1, spacing contact 3e, marking contact 5e, marking contact 4e, marking contact 2f, marking contact 1e, to ground connection 705. The closure of the sensing contacts is controlled by the "Figures" signal perforated in the tape of reperforator-transmitter No. 1.

Relay 9–FG upon operating: (1) prepares at its lower armature and contact a locking circuit for itself over armature No. 3 and front contact of relay 9–FHR to conductor 7–H1; (2) prepares at its upper armature and contact an operating circuit for relay 9–FH. If no ground appears on conductor 7–H1 following the removal of ground from conductor 7–FG1 and within the release time of relay 9–FG, relay 9–FG will be released, recognizing that the "Figures" signal was not part of an "end-of-message" code signal. If ground is found on conductor 7–LT1 directly following ground on conductor 7–FG1, conductor 7–LT1 will be opened at relay 9–FH, since relay 9FH did not operate, and recognizes that the "Figures" signal was not part of an "end-of-message" code signal. No other signals will supply ground connection to conductors 7FG1, 7–H1 or 7–LT1. Since the "end-of-message" code signal inaugurates definite circuit action and is supplied by the coding circuit to every message, it is essential that undesired "end-of-message" signals should not be supplied in error from the keyboard of the teletypewriter. The teletypewriter used with this circuit is arranged with a mechanical lock on the keyboard so that the dispatcher can not send the signals "Figures" and "H" in succession, as disclosed in the application of D. E. Branson, Serial No. 220,564, filed April 12, 1951.

Assuming that a valid "end-of-message" code signal has operated relay 9–FG, the succeeding ground connection on conductor 7–H1 will operate and lock relay 9–FH, the circuit being traceable from ground connection 705, spacing contact 2b, spacing contact 4b, marking contact 5b, marking contact 3b, spacing contact 1b, conductor 7–H1, front contact and armature No. 3 of relay 9–FHR, then in parallel paths, one extending over the lower armature, front contact and winding of relay 9–FG, to grounded negative source of potential of 48 volts whereby relay 9–FG locks in its operated position and the other over the contact and upper armature of relay 9–FG, through the winding of relay 9–FH, to grounded source of negative potential of 48 volts whereby relay 9–FH operates. Relay 9–FH upon operating: (1) closes at its lower armature and contact a locking circuit for itself extending to ground at contact and armature No. 7 of relay 9–FHR; (2) prepares an inner upper armature and front contact an operating circuit for relay 9–FHL, the circuit extending over conductor 7–LT1; and (3) prepares at its upper outer armature and front contact an operating path for relay 9–TM, the circuit extending over conductor 7–TA1′ to the transmitter auxiliary contacts 7–TA1 of reperforator-transmitter No. 1.

When ground is applied to conductor 7–LT1 by the passage of the "Letters" signal combination perforated in the tape of reperforator-transmitter No. 1 a circuit is closed extending from ground connection 705, marking contact 1e, marking contact 2f, marking contact 4e, marking contact 5e, marking contact 3f, conductor 7–LT1, front contact and armature No. 4 of relay 9–FHR, inner upper armature and front contact of relay 9–FH, through the winding of relay 9–FHL, to grounded source of negative potential of 48 volts and relay 9–FHL operates. Relay 9–FHL upon operating: (1) closes at its inner lower armature and front contact a locking circuit for itself extending to ground at the front contact and armature No. 7 of relay 9–FHR; (2) prepares at its outer lower armature and front contact an operating path for relay 9–FHC which does not operate until the distributor auxiliary contacts 7–DA1 opens at the end of the revolution of the distributor shaft during which time the "Letters" signal is transmitted to repeating relay 10–PT2.

When the transmitter auxiliary contacts 7–TA1 of reperforator-transmitter No. 1 closes during the transmission of the "Letters" signal, relay 9–TM operates in a circuit extending over conductor 7–TA1', front contact and outer upper armature of relay 9–FH, through the winding of relay 9–TM, to grounded source of negative potential of 48 volts. Relay 9–TM upon operating: (1) closes at its lower armature and front contact a locking circuit for itself extending to the front contact and armature No. 7 of relay 9–FHR; (2) opens at its upper armature and back contact the operating circuit for transmitting clutch release magnet 7–TRANS of reperforator-transmitter No. 1, the circuit being traceable over conductor 7–TM1, back contact and upper armature of relay 9–TM, conductor 918, armature No. 1 and front contact of relay 9–FHR, conductors 919 and 920, back contact and armature No. 4 of switching relay 10–SW, conductor 603, back contact and innermost lower armature of relay 6–TO1, conductor 602, back contact of innermost lower armature of relay 6–MA1, normally closed contacts of transmitter-stop key 6–TS1, conductor 7–TS1' to transmitter-stop contact 7–TS1 closed by the presence of tape, to ground.

With the transmitter clutch release magnet 7–TRANS operating circuit open at the back contact and upper armature of relay 9–TM the transmitter release magnet will release and the transmitter of reperforator-transmitter No. 1 will be arrested at the end of the transmission of the "Letters" signal and no further transmission from the tape of reperforator-transmitter No. 1 can take place. Opening of the transmitter auxiliary contact 7–TA1 at this time will not affect the operated condition of relay 9–TM since relay 9–TM is now locked to ground at the front contact and armature No. 7 of relay 9–FHR. When the distributor auxiliary contact 7–DA1 opens after the transmission of the "Letters" signal, ground will be removed from conductor 7–DA1 permitting relay 9–FHS to operate and the circuit hereinbefore prepared becomes effective and relay 9–FHC thereby operates.

Relay 9–FHC upon operating, closes at its armature and contact an operating circuit for relay 8–END which now operates, the circuit being traceable over conductors 921 and 829. Relay 8–END upon operating, (1) closes at its armature No. 2 and front contact a locking circuit for itself extending over several paths, such as to ground at the front contact and middle upper armature of relay 8–LK, to ground at the front contact and armature No. 7 of relay 8–ST, and over conductors 826 and 825 to ground at both the front contact and upper armature of relay 9–FHA and the front contact and inner upper armature of relay 9–SSA; (2) continues at its back contact and armature No. 4 the disabling break in the ground circuit extending over conductor 8–KCG to the dispatcher's control keys; (3) opens at its No. 5 armature and back contact the locking circuit for relay 8–MA and the operating circuit for relay 8–LK and relays 8–MA and 8–LK release; (4) opens at its No. 6 armature and back contact the locking circuit for relay 8–AMA which releases; (5) opens at its No. 7 armature and back contact two locking paths, one for relays 9–FHA and 9–FHB and the other for 9–SSA and 9–SSB and these four relays release; (6) closes at its No. 6 armature and front contact a substitute operating path for supervisory lamp 2W which is maintained lighted after relay 8–LK releases; and (7) opens at its No. 1 armature and back contact the holding path for relay 8–ST and relay 8–ST releases.

Relay 8–ST upon releasing, (1) restores at its make-before-break contact the connection of the keyboard of teletypewriter 2–TTY to the winding of repeating relay 10–PT1 whereby the keyboard is conditioned for operation; (2) opens at its No. 1 armature and front contact the operating circuit for switching relay 10–SW which had previously been opened by the operation of relay 9–FHR; (3) removes at its No. 2 armature and front contact the grounded source of positive potential of 130 volts from conductor 821 which is arranged for connection to the code points of the vacuum tube coding circuit, through the contacts of bank No. 5 of the selector switch; (4) opens at its No. 7 armature and front contact one of the locking circuits for relay 8–END but relay 8–END remains operated over its operating circuit to ground at the armature and contact of relay 9–FHC; (5) closes at its No. 6 armature and back contact the circuit for reoperating relay 9–DM and relay 9–DM operates which is its normal condition during the idle period of the address circuit; and (6) removes at its No. 4 armature and front contact the disabling ground connection from the keyboard of teletypewriter 2–TTY pending the operation of relay 9–FHB.

Relay 8–LK upon releasing, (1) prepares at its innermost upper armature and front contact a circuit for connecting activating ground to the dispatcher's control keys when relay 8–END releases; (2) opens at its middle upper armature and front contact one of the locking paths for relay 8–END; (3) opens at its inner lower armature and front contact a locking circuit for relay 9–TW; and (4) opens at its outer lower armature and front contact the operating path for lighting lamp 9W which is maintained lighted at the No. 6 armature and front contact of relay 8–END.

Relay 8–MA upon releasing, disconnects at its upper armature and contact the connection of contact No. 3 of bank No. 4 of the selector switch from ground at the lower armature and front contact of relay 8–SS. Relay 8–AMA upon releasing, (1) opens at its upper armature and front contact the operating circuit for relay 8–MA; and (2) opens at its outer lower armature and front contact a locking circuit for relay 9–TW. Relays 9–FHA and 9–SSA upon releasing, (1) open at their respective upper armatures and front contacts a locking path for relay 8–END; and (2) re-establish over their respective lower armatures and back contacts the operating path of distributor clutch release magnet 7–DIST of reperforator-transmitter No. 1 closed over conductor 7–DM1 for the next cycle of operation.

Relay 9–FHB upon releasing, (1) reconnects at its upper normally closed make-before-break contacts the distributor common lead 7–DC1 of the reperforator-transmitter No. 1 to the No. 4 armature of relay 8–ST where it will be available for the next operating cycle; and (2) connects at its lower normally closed make-before-break contacts the winding of repeating relay 10–PT2 to grounded conductor 804, the ground connection being had at the upper normally closed make-before-break contacts of relay 8–TMA whereby repeating relay 10–PT2 is held in its marking position for the next operating cycle. Relay 9–SSB upon releasing, (1) opens at its upper armature and front contact the self-stepping path from contact No. 3 of contact bank No. 1 of the selector switch to the off-normal, or back, contact of stepping magnet 8–STEP; and (2) opens at its lower armature and front contact the operating path for relay 9–FHR thereby releasing relay 9–FHR. Relay 9–FHR upon releasing, (1) disconnects at its armatures Nos. 2, 3 and 4 the reading fan conductors 7–FG1, 7–H1 and 7–LT1, respectively, from the reperforator-transmitter No. 1; (2) opens at its No. 1 armature and front contact the circuit of the transmitter clutch release magnet 7–TRANS over conductor 7–TM1 for the next operating cycle; (3) close at its No. 5 armature and back contact the operating path of switching relay 10–SW which path is completed when relay 8–ST operates for the next cycle of operation; (4) opens at its No. 7 armature and front contact the locking circuit of relays 9–FH, 9–FHL and 9–TM, all of which release to prepare for the next cycle of operation; and (5) reconnects at its armature No. 6 and back contact the distributor auxiliary contact 7–DA1 of reperforator-transmitter No. 1 to the winding of relay 8–SS when relay 8–ST operates for the next cycle of operation.

Since all the locking circuits holding relay 8–END have now been opened, relay 8–END will release. Relay 8–END upon releasing, (1) opens the holding circuit for supervisory lamp 2W which now becomes extinguished; and (2) re-establishes at its lower armatures and back contacts paths that will again serve to lock relays 8–LK, 8–MA, 8–AMA, 9–FHA, 9–FHB, 9–SSA, and 9–SSB in their operated position during the next cycle of operation.

The idle condition has now been re-established in the dispatcher's portion of the circuit with the dispatched message and its appended addresses and supervisory switching codes stored in the reperforator-transmitter No. 2.

OPERATION FOR AUTOMATIC ADDRESS MESSAGE HAVING TWO TO FIVE ADDRESSES

The sequence of operations for the address circuit in this case is the same as that hereinbefore described for the single address except that conductors 2A and 2B, 3A and 3B, 4A and 4B and 5A and 5B should be cross-connected to conductors corresponding to the first and second letters respectively for whichever group of two, three, four or five addresses is desired. The conductor of conductors 2–CT1 to 2–CT10 should be cross-connected to one of the contacts Nos. 9, 12 and 15 of contact bank No. 4, depending on whether the operated relay of relays 2–AA1 to 2–AA10 is to furnish a two-, three-, or four-address message, or left open for a five-address message, in which event as herebefore stated, contact bank No. 4 of selector switch is shunted.

The self-advancing action of the selector switch will be initiated at the selector switch contacts Nos. 9, 12 or 15 to which the particular conductor of conductors 2–CT1 and 2–CT10 is connected. It will therefore occur at the end of the "Letters" signal following the last address controlled by the operated key of keys 2–AA1 to 2–AA10.

The operation of all automatic address keys and their associated relays 2–AA1′ to 2–AA10′ is identical except that the code connecting point and the code terminating point associated with each key should be cross-connected as described hereinbefore to effect the desired conduction of the vacuum tubes in the vacuum tube coding circuit.

OPERATION FOR A MANUALLY ADDRESSED MESSAGE

*Typing the message*

The dispatcher will type the message on the dispatcher's teletypewriter 2–TTY in the manner previously described.

After the message has been typed the dispatcher will operate "manual address" key 2–MA which is of the locking type, to operate relay 8–TMA. Relay 8–TMA upon operating, remains operated as long as key 2–MA is locked operated and in this position perfoms the following functions: (1) shifts at its innermost upper and its innermost lower armature the connection of the teletypewriter keyboard, or transmitting contacts 202, from the line winding of repeating relay 10–PT1 to the line winding of repeating relay 10–PT2, through resistor 8–TMA′; the substituted path extends over the innermost upper armature and front contact of relay 8–TMA, conductor 804, lower normally closed make-before-break contacts of relay 9–FHB, conductors 905 and 906, resistor 10–MB5, upper winding of relay 10–PT2, resistor 10–B2, to grounded source of positive potential of 130 volts, to hold relay 10–PT2 normally operated to its marking position; the effect of the innermost lower armature of relay 8–TMA engaging the associated front contact connects ground to a path extending over resistor 8–TMC, conductor 803, normally closed make-before-break contact of relay 8–ST, conductor 801, resistor 10–MB3, upper winding of repeater relay 10–PT1, resistor 10–B1, to grounded source of positive potential of 130 volts, whereby relay 10–PT1 also is normally operated to its marking position; (2) connects at its middle lower armature and front contact ground to a circuit extending over conductor 805, through lamp 2–T, to a grounded source of negative potential of 48 volts, and lamp 2–T lights to indicate that the manual address key 2–MA is operated; (3) connects at its outermost lower armature and front contact ground to a circuit extending over conductor 806 to the middle upper armature of relay 9–TW which, if operated at this time, will complete the locking circuit for relay 9–TW, relay 9–TW being initially operated when tape is placed in reperforator-transmitter No. 2 to close transmitter-stop contacts 11–TS2; (4) opens at its outermost upper armature and back contact the operating circuit for relay 8–MA; and (5) closes at its middle upper armature and front contact the operating circuit for relay 8–AMA which operates.

Relay 8–AMA upon operating, (1) prepares at its upper armature and front contact the operating circuit for relay 8–MA which operates when relay 8–TMA releases; (2) closes at its inner lower armature and front contact a locking circuit for itself extending over conductor 807, back contact and middle lower armature of relay 8–END, to ground and relay 8–AMA locks in its operated position; and (3) closes at its outer lower armature and front contact a connection to ground for the locking circuit of relay 9–TW, which circuit extends over conductors 808 and 806, middle upper armature, front contact and upper winding of relay 9–TW, locking relay 9–TW in its operated position if it is in an operated condition at the time.

When lamp 2–T lights the dispatcher will type the addresses of the message on the teletypewriter keyboard, and transmitting contacts 202 will accordingly operate relay 10–PT2 which will in turn operate selector magnet 11–SEL of reperforator-transmitter No. 2 to set up the addresses on the tape of such reperforator-transmitter.

*Dispatching a manually addressed message*

After the addresses have been typed the dispatcher will release manual address key 2–MA and relay 8–TMA will consequently release. Relay 8–TMA upon releasing, (1) reconnects ground to a path extending over resistor 8–TMD, upper normally closed make-before-break contacts of relay 8–TMA, conductor 804, lower normally closed make-before-break contacts of relay 9–FHB, conductors 905 and 906, resistor 10–MB5, through the upper winding of repeating relay 10–PT2, resistor 10–B2, to grounded source of positive potential of 130 volts to normally held relay 10–PT2 in its marking position; (2) reconnects at its lower normally closed make-before-break contact the line winding of repeating relay 10–PT1 to the teletypewriter keyboard whereby relay 10–PT1 is normally held in its marking position; (3) opens at its outermost lower armature and front contact the locking circuit for relay 9–TW which, if operated at this time, is still held operated by relay 8–AMA; (4) closes at its outermost upper armature and back contact an operating circuit for relay 8–MA, the circuit being traceable from grounded source of negative potential of 48 volts through the upper winding of relay 8–MA, conductor 809, outermost upper armature and back contact of relay 8–TMA, upper armature and front contact of relay 8–AMA, conductor 810, back contact and armature No. 3 of relay 8–END, to ground, and relay 8–MA operates; (5) opens at its middle lower armature and front contact the operating circuit for lamp 2–T which becomes extinguished; and (6) opens at its middle upper armature and front contact the operating circuit for relay 8–AMA which is now locked operated to ground at the middle lower armature and back contact of relay 8–END.

Relay 8–MA upon operating, (1) closes at its lower armature and front contact a locking circuit for itself which extends over conductors 811, 812 and 813, through the winding of relay 8–LK, conductor 817, back contact and armature No. 5 of relay 8–END, to ground whereby this circuit in addition to locking relay 8–MA, also operates relay 8–LK; and (2) prepares at its upper armature and front contact a circuit extending from ground at the lower armature and front contact of relay 8–SS which at this time is in an unoperated condition, conductors 814, 815 and 816, front contact and upper armature of relay 8–MA, conductor 817, to contact No. 3 on bank No. 4 of the coding selector switch.

When relay 8–LK operates it initiates the sequence of operations as hereinbefore described beginning with the operation of relay 8–LK and ending with the operation of the selector switch to contact No. 3 of all banks, the "end-of-message" code signal being set up on the tape in reperforator-transmitter No. 1, and relay 9–FHA operated.

Relay 9–FHA upon operating, (1) prepares at its upper armature and front contact a locking circuit for relay 8–END, the circuit being traceable from grounded source of negative potential of 48 volts, through the winding over armature No. 2 and front contact of relay 8–END, conductor 825, to ground at the armature of relay 9–FHA; (2) prepares at its inner lower armature and front contact a locking circuit for itself, the circuit extending through the winding of relay 9–FHB, over conductor 913, through the winding of relay 9–FHB, conductor 914, to ground at the outermost lower armature and back contact of relay 8–END; and (3) opens at its outer lower armature and back contact the operating circuit for the distributor clutch release magnet 7-DIST of reperforator-transmitter No. 1, the circuit extending from ground at armature No. 1 and front contact of relay 10–SW, conductor 912, back contact and armature of relay 9–DM, conductor 911, outer lower armature and back contact of relay 9–FHA, back contact and lower armature of relay 9–SSA, conductor 7–DM1, conductor 703, through the winding of distributor magnet 7–DIST, to grounded source of negative potential of 48 volts whereby distributor magnet 7–DIST is therefore maintained unoperated at the completion of the transmission of the "Letters" signal with the normally closed stop contact of distributor contact 701 closed.

The distributor shaft of reperforator-transmitter No. 1 will be held in its normal position when it stops at the completion of the "Letters" signal. When this occurs the distributor common lead 7–DC1 is closed to ground through the stop contact of distributor contact 701, conductors 704 and 604, resistor 6–DCG, to ground. This ground connection will hold relay 10–PT1 in the marking condition until the next circuit function is indicated.

Relay 9–SSA upon operating as hereinbefore described under the description of an automatically addressed message, (1) prepares a locking circuit for relay 8–END; (2) prepares to close a locking circuit for itself, the circuit extending from the front contact and outer upper armature of relay 9–SSA, through the winding of relay 9–SSB, conductor 915, armature and back contact of relay 8–ULK, conductor 914, back contact and armature No. 7 of relay 8–END, to ground; and (3) opens at its lower armature and back contact the circuit extending over conductor 7–DM1 to the distributor clutch release magnet 7–DIST.

When the distributor auxiliary contact 7–DA1 opens at the end of the "Letters" signal relays 9–FHB and 9–SSB will operate through the locking path of relays 9–FHA and 9–SSA, respectively, by the loss of ground at relay 8–SS.

Relay 9–FHB upon operating, (1) shifts the distributor common conductor 7–DC1 of the reperforator-transmitter No. 1 to the line winding of relay 10–PT2; (2) shifts the line winding of relay 10–PT1 back to the teletypewriter keyboard; (3) removes ground from the conductor 801 and permits the operation of relay 10–PT1 from the keyboard of the dispatcher's teletypewriter; and (4) closes at its outermost upper armature and front contact the operating circuit for distributor clutch release magnet 7–DIST which circuit is still maintained opened at the back contact and lower armature of relay 9–SSA.

Relay 9–SSB upon operating, (1) closes at its upper armature and front contact the circuit extending from grounded source of negative potential of 48 volts, through the winding of relay 8–SS, armature and back contact of stepping magnet 8–STEP, conductors 827 and 916, front contact and upper armature of relay 9–SSB, conductor 407, contact No. 3 and brush of the selector switch of bank No. 1, to ground; and (2) prepares at its front contact and lower armature an operating circuit for relay 9–FHR which will close when the selector switch completes its cycle and the brush on bank No. 1 comes to rest on contact No. 1. The ground supplied by conductor 407 in function No. 1 will cause relay 8–SS and the stepping magnet 8–STEP to automatically operate and release. The selector will then self-step until the brushes on the selector banks reach contacts Nos. 19. During this time another message may be typed on the keyboard and set up on the tape in the reperforator-transmitter No. 1. This message may not yet be dispatched nor manually addressed. This is indicated to the operator by the presence of the lighted condition of lamp 2–W, and the disabled condition of the dispatching key and also by failure of lamp 2–T to light if the manual address key 2–MA is operated.

When the brush of bank No. 2 of the selector switch is on contact No. 19 ground is connected to conductor 408 to operate relay 8–ULK, the circuit extending over the back contact of relays 8–LCL and 8–CAN. At bank No. 5 of the selector switch grounded positive potential of 130 volts is furnished over armature No. 2 and front contact of relay 8–ST, conductor 821, brush on contact No. 19, conductor 409, to the "carriage return" coding point in the vacuum tube coding circuit.

Relay 8–ULK upon operating, opens at its armature and back contact the operating circuit for relay 9–SSB and the locking circuit for relay 9–SSA and relays 9–SSB and 9–SSA release. Relay 9–SSA upon releasing, (1) closes at its lower armature and back contact the operating circuit for distributor clutch release magnet 7–DIST of reperforator-transmitter No. 1; and (2) opens at its inner upper armature and front contact one of the locking circuits for relay 8–END. Relay 8–SSB upon releasing, (1) opens at its lower armature and front contact the operating circuit for relay 9–FHR; and (2) disconnects grounded conductor 407 from the off-normal, or back, contact of stepping magnet 8–STEP.

The closing of the operating circuit for distributor clutch release magnet 7–DIST will cause the distributor shaft of reperforator-transmitter No. 1 to start rotating and a "carriage return" signal will be perforated in the tape in reperforator-transmitter No. 2 by the operation of repeating relay 10–PT2. This signal will follow the last character of the last code address which was principally set up on this tape by the dispatcher.

The selector switch will advance to contact No. 20 in the manner hereinbefore described thereby releasing relay 8–ULK when the brush of bank No. 2 of the selector switch leaves contact No. 19.

Relay 8–ULK upon releasing, restores the locking circuit for the next operation of relays 8–SSA and 8–SSB. The signals for "line feed" and "Letters" will be set up on the tape in reperforator-transmitter No. 2 when the brushes of the selector switch engage contacts Nos. 20 and 21, respectively.

When the distributor auxiliary contacts 7–DA1 close for the transmission of the "Letters" signal when the brushes of the selector switch are on their respective contacts Nos. 21 to operate relay 8–SS, ground at the lower armature and front contact of relay 8–SS is connected in a circuit extending over conductors 814, 815 and 403, brush on contact No. 21 of bank No. 3 of the selector switch, conductor 406, through the winding of relay 9–SSA, to grounded source of negative potential of 48 volts and relay 9–SSA operates. The subsequent opening of the distributor auxiliary contact 7–DA1 will again operate relay 9–SSB. Relays 9–SSB and 9–SSA upon operating, become locked operated in a circuit extending over conductor 915, lower armature and back contact of relay 8–ULK, conductor 914 to the back contact and armature No. 7 of relay 8–END, to ground.

The selector switch will advance to contacts Nos. 22 where ground at bank No. 1 will be applied to the off-normal, or back, contact of stepping magnet 8-STEP. The selector switch will step once more and come to rest on contact No. 1. This completes the cycle of operation of the selector switch and it will remain on contact No. 1, the idle position, until another message is dispatched.

The address circuit will be restored to normal as hereinbefore described in the description of the automatically addressed message.

OPERATION FOR A LOCAL MESSAGE

*Typing the message*

The dispatcher will type the message on the dispatcher teletypewriter 2–TTY.

*Dispatching the message*

After the message has been typed the dispatcher will momentarily operate, that is, operate and release the "local" message key 2–LCL. The operation of this key which is non-locking will close the operating circuit of relay LCL which will operate, the circuit being traceable from grounded source of potential of 48 volts, through the upper winding of relay 8–LCL, conductor 830, normally open contact of operated key 2–LCL, normally closed contacts of each of keys 2–AA10 to 2–AA1, lower normally closed contacts of key 2–MA, conductor 8–KCG, back contact and lower armature of relay 8–MB, innermost upper armature and back contact of relay 8–LK, back contact and armature No. 4 of relay 8–END, conductor 920, back contact and armature No. 4 of switching relay 10–SW, conductor 603, back contact and innermost lower armature of relay 6–TO1, conductor 602, back contact and innermost lower armature of relay 6–MA1, conductor 601, normally closed contact of transmitter key 6–TS1, conductor 7–TS1′, to transmitter-stop contacts 7–TS1, to ground. Relay 8–LCL upon operating, (1) closes at its middle upper armature and front contact a circuit extending from ground, conductor 831, through the winding of relay 10–CLL, to grounded source of negative potential of 48 volts and relay 10–CLL operates; (2) closes at its outermost upper armature and front contact a circuit traceable from ground at the lower armature and front contact of relay 8–SS conductor 814 and 815, front contact and outermost upper armature of relay 8–LCL conductor 817, contact No. 3 and brush of bank No. 4 of the selector switch; (3) opens at its innermost upper armature and back contact the operating circuit for relay 8–ULK, the circuit extending over conductor 408 to contact No. 19 of bank No. 2 of the selector switch; (4) interconnects at its outer lower armature and front contact, conductors 832 and 833 respectively extending to contacts Nos. 18 and 19 of bank No. 1 of the selector switch; and (5) closes at its inner lower armature and front contact a locking circuit for itself, the circuit extending over conductors 834, 812 and 813, through the winding of relay 8–LK, to ground at the back contact and armature No. 5 of relay 8–END. Relay 10–CLL upon operating, (1) connects at its inner upper armature and front contact the marking contact of repeating relay 10–PT2 to a local teletypewriter loop containing potentiometer 1004 and jack 1005; (2) connects at its lower armature and front contact a grounded source of positive potential of 130 volts to a circuit extending over resistor 10–LP and lower armature of front contact and relay 10–CLL, resistor 10–T2, conductor 11–T2, to the selector magnet 11–SEL of reperforator-transmitter No. 2 which prevents the operation of reperforator-transmitter No. 2 during the transmission of a message to the local teletypewriter loop; and (3) opens at its outer upper armature and front contact the machine-alarm conductor 10–SA2 for the reperforator-transmitter No. 2. Failure of the reperforator-transmitter No. 2 to follow signals from repeating relay 10–PT2 is normal in this case and should not produce an alarm, that is, through the transmission of a message to the local loop.

Relay 8–LK upon operating, will initiate the same sequence of circuit operations as hereinbefore described in the description of a manually addressed message, except that the self-stepping operation of the selector switch will start at contact No. 3 on contact bank No. 1 of the selector switch and continue to step to contact 21. Relay 8–ULK will not be operated at contact No. 19 of contact bank No. 2 of the selector switch inasmuch as its operating circuit is open at the innermost upper armature and back contact of relay 8–LCL. Relays 9–SSA and 9–SSB operate when the brush on contact bank No. 3 engages contact No. 21 the circuit for relay 9–SSA being traceable from grounded source of potential of 48 volts, through the winding of relay 9–SSA, conductor 406, contact 21 and brush of bank No. 3 of the selector switch, conductor 403 and 815 and 814, to ground at the front contact and lower armature of relay 8–SS and the operating circuit for relay 9–SSB extending from the winding of relay 9–SSA, front contact and outer upper armature of the relay, through the winding of relay 9–SSB, conductor 915, armature and back contact of relay 8–ULK, the back contact and armature No. 7 of relay 8–END, to ground. When relay 8–SS releases to perform the stepping operation of the selector switch relay 9–SSB operates. However, relays 9–SSA and 9–SSB will not be released and later reoperated. Therefore no addresses, "end-of-address" code signals will be applied to the message.

When the selector switch releases contact No. 1 at the end of the self-stepping cycle relay 9–FHR will be operated in a circuit extending from grounded source of negative potential of 48 volts, through the winding of relay 9–FHR, front contact and lower armature of relay 9–SSB, conductor 917, contact No. 1 and brush on bank No. 1 of the selector switch, to ground. The sequence of operations will again be the same as hereinbefore described in the description following the operation of relay 9–FHR for a manually addressed message except that the message in the reperforator-transmitter No. 1 will be transmitted directly to the local loop 1001 instead of to reperforator-transmitter No. 2.

OPERATION FOR A CANCELLED MESSAGE

*Typing the message*

The dispatcher will type the message on the dispatcher's teletypewriter 2–TTY.

*Dispatching the message*

After the message has been typed the dispatcher will operate and release "Cancel" key 2–CAN. The operation of this key which is also non-locking, will close the operating circuit of relay 8–CAN, the circuit being traceable from grounded source of negative potential of 48 volts, through the upper winding of relay 8–CAN, conductors 835 and 921, key 2–CAN in an operated condition, through key 2–LCL and keys 2–AA10 to 2–AA1, key 2–MA, all in a normal position, conductor 8–KCG, back contact and lower armature of relay 8–MB, innermost upper armature and back contact of relay 8–LK, back contact and armature No. 4 of relay 8–END, conductor 920, back contact and armature No. 4 of switching relay 10–SW, conductor 603, back contact and innermost lower armature of relay 6–TO1, conductor 602 back contact and innermost lower armature of relay 6–MA1, conductor 602, normally closed contact of transmitter-stop key 3–TS1, conductor 7–TS1′, closed transmitter-stop contacts 7–TS1, to ground. Tape being present in reperforator-transmitter No. 1, transmitter-stop contacts 7–TS1 are closed. Relay 8–CAN operates. Relay 8–CAN upon operating, initiates the same sequence of circuit operation as hereinbefore described in the description of a transmission of a message to a local loop except that relay 10–CLL will not be operated. Instead a ground will be applied at the middle upper armature and back contact of relay 8–CAN to the circuit extending over conductors 842 and 906, resistor 10–MB5, through the upper winding of repeating relay 10–PT2, resistor 10–B2, to grounded source of positive potential of 130 volts. This will maintain the relay 10–PT2 in a marking condition and the message in the reperforator-transmitter No. 1 will be dispatched without being effectively received, since it cannot reach either the selector magnet 11–SEL of reperforator-transmitter No. 2 or the local loop 1001.

OPERATION FOR TRANSMISSION OF A MESSAGE TO A MULTISTATION LINE

The transmitter-stop contact 11–TS1 of reperforator-transmitter No. 2 will be closed by mechanical means upon the appearance of a message tape in the machine. Ground at the transmitter-stop contact 11–TS2 will cause the operation of relay 9–HD, the circuit being traceable from the ground at the transmitter-stop contact 11–TS2, conductor 11–TS2′, normally closed contacts of transmitter-stop key 6–TS2 conductor 605, innermost lower armature and back contact of relay 6MA2, conductor 606, innermost lower armature and back contact of relay 6–TO2, conductor 607, varistor 9–VR1, through the winding of relay 9–HD, to grounded source of negative potential of 48 volts and relay 9–HD operates.

Relay 9–HD upon operating, closes at its armature and front contact the operating circuit for relay 9–TW, the circuit being traceable from grounded source of negative potential of 48 volts through the lower winding of relay 9–TW, back contact and the inner lower armature of relay 9–TWA, to ground at the front contact and armature of relay 9–HD. Relay 9–TW operates. Relay 9–TW upon operating, (1) operates relay 9–TWA through an obvious operating circuit; (2) connects at its innermost upper armature, and front contact, conductor 922 to conductor 11–TM2, conductor 922 extending to the front contact and innermost upper armature of relay 9–STT and conductor 11–TM2 extending to the winding of the transmitter clutch release magnet 11–TRANS of the reperforator-transmitter No. 2; (3) connects at its middle upper armature and front contact, its upper winding to conductor 806 which terminates at the armatures and contacts of three different relays, namely, 8–LK, 8–TMA, 8–AMA, any one or more of which when operated may serve to lock relay 9TW in its operated position; and (4) opens at its lower armature and back contact the operating circuit for relay 10–CB, the circuit being traceable from the lower armature and back contact relay 9–TW, outer upper armature and front contact of 9–TWA, front contact and middle upper armature of relay 9–STT, conductor 923, through the winding of relay 10–CB, to grounded source of negative potential of 48 volts. Relay 9–TWA upon operating: (1) prepares at its outer upper armature and front contact an operating path for relay 10–CB which path is completed when relay 9–STT is operated and relay 9-TW is released; (2) prepares at its inner upper armature and front contact a locking path for itself which extends over the front contact and outermost upper armature of relay 9-STT, conductor 924, to ground at the back contact and armature of relay 10–EB, the path being completed when relay 9–STT operates; (3) opens at its inner lower armature and back contact the original operating circuit for relay 9–TW, and relay 9–TW releases; and (4) connects at its outer lower armature and front contact conductors 901 and 902 whereby the station control circuit 900 is informed that a message is awaiting transmission in reperforator-transmitter No. 2.

No further circuit operation will take place until a grounded positive potential is placed on conductor 907 from station control circuit 900. Station control circuit 900 as hereinbefore stated in the general description, is controlled from a switching center in the private teletypewriter intercommunicating system with which the address circuit operates. In response to the correct transmitter-start code pattern which is transmitted at intervals from the switching center, grounded positive potential is placed on conductor 907 to operate relay 9–STT whereby a circuit is established for starting the transmitter of reperforator-transmitter No. 2. The operation of relay 9–TWA applies a grounded source of positive potential on conductor 901, to conductor 902 extending over conductor 904 to control circuit 900 to connect conductors 11–L2 and 11–TC2 to the send loop of a multistation line whereby a message stored in reperforator-transmitter No. 2 may be transmitted to the switching center terminating that line, as soon as the transmitter clutch release magnet 11–TRANS is operated.

Relay 9–STT upon operating, (1) connects the transmitter clutch release magnet 11–TRANS of the reperforator-transmitter No. 2 over conductor 11–TM2, front contact and innermost upper armature of relay 9–TW, conductor 922, front contact and innermost upper armature of relay 9–STT, conductor 607, to ground at the transmitter-stop contacts 11–TS2 of reperforator-transmitter No. 2; and (2) closes at its outermost upper armature and front contact a locking circuit for relay 9–TWA.

Reperforator-transmitter No. 2 will begin transmitting from the message tape which it is holding. Since relay 10–CB which serves to switch the distributor contacts 1101 between sensing contacts 1*a* to 5*a* of reperforator-transmitter No. 2 and the function contacts, is not operated, sensing contacts 1*a* to 5*a* and distributor contacts 1101 of reperforator-transmitter No. 2 are interconnected. The ground side of the sensing contacts have a common side conductor 1104 and the distributor contacts are connected to the send side of the multistation line in the private teletypewriter intercommunicating system, through the station control circuit 900, over conductors 11–L2 and 11–TC2 and the message on the tape of reperforator-transmitter No. 2 will be transmitted to the sending loop of the private teletypewriter intercommunicating system. Transmission will continue until the last character on the tape has been transmitted and the transmitter-stop contacts 11–TS2 open. Transmission from reperforator-transmitter No. 2 will be stopped by the opening of the transmitter-stop contacts 11–TS2. After a delay of about 200 milliseconds relay 9–HD will be released.

At this time one or more relays of relays 8–LK, 8–TMA and 8–AMA may be operated because of the processing of a message which has not yet reached the reperforator-transmitter No. 2. If so, relay 9–TW will not be released by the release of relay 9–HD. When the message in process arrives in reperforator-transmitter No. 2, transmitter-stop contacts 11–TS2 will be closed and transmission will be resumed. When the last character signal in the tape in reperforator-transmitter No. 2 has been transmitted and relays 8–LK, 8–TMA and 8–AMA are released, relay 9–TW will be released upon the release of relay 9–HD.

Relay 9–TW upon releasing, (1) opens at its lower armature and front contact the operating circuit for relay 9–TWA which is now locked to relay 10–EB; (2) opens at its innermost upper armature and front contact the operating circuit of transmitter clutch release magnet 11–TRANS of reperforator-transmitter No. 2, over conductor 11–TM2; and (3) closes at its lower armature and back contact the operating circuit for relay 10–CB, the circuit being traced from ground at the lower armature and back contact of relay 9–TW, outer upper armature and front contact of relay 9–TWA, front contact and middle upper armature of relay 9–STT, conductor 923, through the winding of relay 10–CB, to grounded source of negative potential of 48 volts, and relay 10–CB operates.

Relay 10–CB upon operating, (1) transfers distributor conductors 11–D12, 11–D22, 11–D32, 11–D42 and 11–D52 of reperforator-transmitter No. 2 from transmitter conductors 11–T12, 11–T22, 11–T32, 11–T42 and 11–T52, respectively, of reperforator-transmitter No. 2, to a code transmitting circuit comprising the front contacts respectively associated with armatures Nos. 2, 3, 4, 6 and 7 of relay 10–CB and armatures Nos. 2, 3 and 4 of relay 10–DB (with only relay 10–CB operated, transmitter common conductor 11–TC2 will be connected to contacts Nos. 3 and 5 of distributor contacts 1101 and with marking current on these two contacts only an "H" character signal is coded for transmission over the send side of the multistation line, since signal impulses on conductor 11–TC2 are transmitted over the send side of that line); (2) connects at its No. 1 armature and front contact distributor auxiliary contact 11–DA2 of reperforator-transmitter No. 2, over conductor 11–DA2′, armature No. 5 and back contact of relay 10–DB, through the winding of relay 10–DA, to grounded source of negative potential of 48 volts and relay 10–DA operates; (3) connects at its No. 8 armature and front contact distributor clutch release magnet 11–DIST of reperforator-transmitter No. 2, the circuit being traceable over conductors 1103 and 11–DM2, armature No. 8 and front contact of relay 10–CB, conductor 1006, upper armature and back contact of relay 10–DA, conductor 1007, back contact and upper armature of relay 10–EA, to ground; and (4) connects at its No. 5 armature and front contact an operating ground for preparing relays 10–EB and 10–DB for operation.

Distributor clutch release magnet 11–DIST operates and the distributor shaft of reperforator-transmitter No. 2 starts to rotate to send the "H" character signal to the send side of the multistation line. The opening and subsequent closure of the distributor auxiliary contacts 11–DA2 caused by the rotation of the distributor shaft through one revolution, will operate relays 10–DA and 10–DB in succession, the circuit for relay 10–DA being traceable over conductor 11–DA2, armature No. 1 and front contact of relay 10–CB, conductor 1008, armature No. 5 and back contact of relay 10–DB, through the winding of relay 10–DA, to grounded source of negative potential of 48 volts.

Relay 10–DA upon operating, (1) opens the circuit of the distributor clutch release magnet 11–DIST pending the operation of relay 10–DB; and (2) prepares a locking circuit for itself which circuit extends over its front contact and lower armature, through the winding of relay 10–DB, to ground at front contact and armature No. 5 of relay 10–CB, the locking path serving to hold relay 10–DA operated during the time when distributor auxiliary contacts 11–DA2 open. Relay 10–DB upon operating, (1) connects at its armatures Nos. 2, 3 and 4 and their respective contacts, transmitting common conductor 11–TC2 of reperforator-transmitter No. 2 to distributor contacts Nos. 1, 2 and 4, and these contacts Nos. 1, 2 and 4 together with the other contacts Nos. 3 and 5 of distributor contacts 1101, contacts 3 and 5 being already connected to conductor 11–TC2, set up the condition for transmitting a "Letters," or all marking current, signal to the send side of the line; (2) closes at its No. 1 armature and front contact the holding circuit for distributor clutch release magnet 11–DIST; and (3) transfers at armature No. 5 and front contact the circuit closed by the distributor auxiliary contacts 11–DA2, from the winding of relay 10–DA to the winding of relay 10–EA, and relay 10–EA operates.

When distributor auxiliary contacts 11–DA2 close and open for the "Letters" signal, relays 10–EA and 10–EB operate successively.

Relay 10–EA upon operating, (1) opens at its upper armature and back contact the operating circuit of distributor clutch release magnet 11–DIST of the reperforator-transmitter No. 2 which will stop transmitting at the end of the "Letters" signal; and (2) prepares at its lower armature and front contact a locking circuit for itself which circuit extends through the winding of relay 10–EB, to ground at the front contact and armature No. 5 of relay 10–CB, and relay 10–EA is held operated, when distributor auxiliary contacts 11–DA2 open at the end of the "Letters" signal. Relay 10–EB upon operating, removes ground at its armature and back contact from the locking path of relay 9–TWA, releasing relay 9–TWA.

Relay 9–TWA upon releasing, (1) opens at its outer upper armature and front contact the operating circuit for relay 10–CB which releases; (2) opens at its outer lower armature and front contact the operating circuit for relay 9–STT which releases; and (3) closes at its inner lower armature and back contact the original operating circuit for relay 9–TW and relay 9–TW operates for the next operating cycle. Relay 9–STT upon releasing, opens at its innermost upper armature and front contact the operating circuit of transmitter clutch release magnet 11–TRANS of reperforator-transmitter No. 2.

Relay 10–CB upon releasing, (1) reconnects conductors 11–T12, 11–T22, 11–T32, 11–T42 and 11–T52 to conductors 11–D12, 11–D22, 11–D32, 11–D42 and 11–D52, respectively, in preparation for the next operating cycle, the former group of conductors being connected to the transmitting, or sensing, contacts and the latter group being connected to the distributor contacts of the reperforator-transmitter No. 2; (2) opens at its No. 1 armature and front contact operating circuit for relay 10–DA which is locked operated and at its No. 8 armature and its front contact the operating circuit of distributor clutch release magnet 11–DIST which releases pending the next operating cycle; and (3) opens at its armature No. 5 and front contact the locking circuit for relays 10–DA and 10–EA, both of which release, and relays 10–DB and 10–EB consequently release.

Relays 10–DA, 10–DB, 10–EA and 10–EB upon releasing, complete the restoration of the address circuit to an idle condition. The transmission of the "H" and "Letters" signals to the send loop indicates to the switching center that no further business is available at this automatic address station and the switching center initiates a search, by means of transmitter start codes, for another station on the multistation line having message business awaiting transmission.

OPERATION OF ALARM CIRCUIT

*Machine alarm*

As hereinbefore described under "Machine Alarm Circuit" in the General Description, this alarm is initiated by the failure of a machine, that is, a reperforator-transmitter, to operate on the signals from one of the repeating relays which drives it. The alarm circuit for the reperforator-transmitter No. 1 and reperforator-transmitter No. 2 are identical except that the alarm circuit on the reperforator-transmitter No. 2 must be deactivated when relay 10–PT2 is transmitting to the local loop.

In connection with the reperforator-transmitter No. 1 when repeating relay 10–PT1 is in its normal, or marking, condition the armature of the relay is in engagement with its marking, or left-hand, contact. Since ground connection 702 is brought into engagement with the alternate contact of the universal contact 7–U1 during each rotation of the transmitter shaft of reperforator-transmitter No. 1 this ground is connected to conductor 7–U91 during the transmission of each signal combination. Also, since the spacing, or right-hand, contact of repeating relay 10–PT1 is open at this time the grounded source of negative potential of 48 volts is applied to the grid elements of each triode of vacuum tube 6–VT6 and these grids are negatively biased with respect to the cathode, which is grounded. Condensers 6–C1, 6–C2 and 6–C3 will also be negatively charged. When repeater relay 10–PT1 starts to send signals but the transmitter shaft of reperforator-transmitter No. 1 does not rotate, a positive potential of 130 volts will be applied to a circuit extending over resistor 10–SA1′, armature and spacing contact of relay 10–PT1, conductor 10–SA1, during each spacing element of the signal. Within the transmitting time of three or four signal combinations or characters (at 75-word speed signal transmission) a sufficient positive charge will have been built up in condenser 6–C1 to nullify the negative bias on the grids of both triodes of vacuum tube VT6 and vacuum tube VT6 will become conducting to operate relay 6–MA1.

Relay 6–MA1 upon operating, (1) closes at its outer upper armature a circuit for lighting lamp 6–MA1 and the lamp lights to indicate that reperforator-transmitter No. 1 is not operating satisfactorily; (2) closes at its inner upper armature and front contact an obvious operating circuit for buzzer 6–BUZ which operates to furnish an audible signal indicating trouble in the reperforator-transmitter No. 1, the buzzer serving to indicate trouble in either of the reperforator-transmitters and the lamp, such as lamp 6–MA1 to indicate which of the reperforator-transmitters is in trouble; (3) closes at its middle lower armature and front contact a locking circuit for itself extending over conductor 608, front contact and middle lower armature of relay 6–MA1, conductor 609, to the left-hand normally closed contact of alarm release key 6–AR, to ground; (4) opens at its innermost lower armature and back contact the circuit of the transmitter-stop contacts 7–TS1 of reperforator-transmitter No. 1 which circuit serves to operate any one of the relays controlled by a key of the dispatcher's control keys; and (5) closes at its outermost lower armature and front contact the operating circuit for make-busy relay 8–MB, the circuit being traceable from grounded source of negative potential of 48 volts, through the winding of relay 8–MB, conductors 836 and 610, outermost lower armature and front contact of relay 6–MA1, to ground, and make-busy relay 8–MB operates.

Relay 8–MB upon operating, (1) closes at its inner upper armature and front contact an operating circuit for busy lamp 2–BSY the circuit being traceable over conductor 837; (2) opens at its lower armature and back contact the circuit path of grounded conductor 8–KCG which at one end is connected to ground at the transmitter-stop contact 7–TS1 and at the other end to grounded source of negative potential of 48 volts connected to the winding of one of the relays controlled by a key of the dispatcher's control keys thereby disabling the dispatcher's control keys; and (3) connects at its outer upper armature and front contact a ground connection to conductor 208 to establish a parallel ground with that at transmitting contacts 202 of dispatcher's teletypewriter 2–TTY whereby the keyboard of such teletypewriter is disabled.

An attendant at the dispatcher's station upon observing the alarm may suppress the audible alarm signal by operating the audible alarm suppression key 6–AA which upon being momentarily operated operates relay 6–AA in an obvious operating circuit. Relay 6–AA upon being operated, (1) disconnects at its upper armature and back contact buzzer 6–BUZ; and (2) locks itself to a circuit traceable to ground at the left-hand normally closed contacts of alarm release key 6–AR.

The attendant at the dispatcher's station upon clearing the trouble may momentarily operate alarm release key 6–AR to open the locking path of relays 6–MA1 and 6–AA thereby releasing both these relays. Relay 6–MA1 upon being released, (1) opens at its outer upper armature and front contact the operating circuit for lamp 6–MA1 which now becomes extinguished; (2) closes at its innermost lower armature and back contact transmitter-stop contact circuit which extends over conductor 7–TS1 to prepare the dispatcher's control keys for being restored to operable condition; and (3) opens at its outermost lower armature and front contact the operating circuit for make-busy relay 6–MB which releases. Relay 6–MB upon releasing, (1) opens at its inner upper armature and front contact the operating circuit for busy lamp 2–BSY which becomes extinguished; (2) re-establishes at its lower armature and back contact the circuit of ground conductor 8–KCG whereby the dispatcher's control keys are made operable; and (3) disconnects at its outer upper armature and front contact the ground connection from conductor 208 to remove the parallel shunt from transmitting contacts 202 of dispatcher's teletypewriter 2–TTY and the teletypewriter keyboard is restored to operable condition.

The alarm circuit is now cleared and the station circuit is restored to its normal condition.

*Tape-out alarm*

This alarm is initiated by the closure of the "tape-out" contact in a reperforator-transmitter. For example, in reperforator-transmitter No. 1, the closure of tape-out contacts 7–TO1 will close when the tape is broken or otherwise removed from the machine. The tape-out contacts 7–TO1 upon closing, complete a circuit traceable over conductor 7–TO1, through the winding of relay 6–TO1, to grounded source of negative potential of 48 volts and relay 6–TO1 operates. Relay 6–TO1 upon operating (1) closes at its outer upper armature and front contact an obvious operating circuit for tape-out lamp 6–TO1 and lamp 6–TO1 lights to indicate that there is no tape in the machine of reperforator-transmitter No. 1; (2) closes at its inner upper armature and front contact an obvious operating circuit for buzzer 6–BUZ which operates to furnish an audible alarm that there is trouble in either or both of reperforator-transmitters No. 1 and No. 2; (3) closes at its middle lower armature and front contact a locking circuit for itself traceable to the left-hand normally closed contacts of alarm release key 6–AR; (4) opens at its innermost upper armature and front contact the circuit of transmitter-stop contacts 7–TS1 of reperforator-transmitter No. 1 whereby the dispatcher's control keys are disabled, the circuit being traceable over conductor 7–TS1; and (5) closes at its outermost lower armature and front contact an operating circuit for make-busy relay 8–MB the circuit being traceable over conductor 837 as hereinbefore described.

The description of the tape-out alarm for reperforator-transmitter No. 1 should be sufficient for an understanding of the tape-out alarm provided for reperforator-transmitter No. 2.

*Tape-reel-out alarm*

This alarm is initiated by the closure of the "tape-reel-out" contacts on either reperforator-transmitter No. 1 or 2. For example, in connection with reperforator-transmitter No. 1 the closure of the tape-reel-out contacts 7–TRO1 will complete a circuit traceable over conductors 7–TRO1′ and 611, through the winding of relay 6–TRO, to grounded source of negative potential of 48 volts and relay 6–TRO operates. Relay 6–TRO upon operating, (1) closes at its outer upper armature and front contact an operating circuit for lighting tape-reel-out lamp 6–TRO and lamp 6–TRO lights to indicate that the sufficient supply of tape on the reel at either of the machines is near exhaustion; (2) closes at its inner upper armature and front contact an operating circuit for buzzer 6–BUZ which operates to furnish an audible alarm of the insufficiency of tape on the reel at either of the machines; and (3) closes at its lower armature and front contact a locking circuit for itself extending to the left-hand normally closed contacts of alarm release key 6–AR. When the supply of tape on the reel in reperforator-transmitter No. 2 becomes insufficient the tape-reel-out contacts 11–TRO2 are closed to complete a circuit extending over conductors 11–TRO2′ and 611, through the winding of relay 6–TRO to the grounded source of negative potential of 48 volts and relay 6–TRO operates to perform the same operations as hereinbefore described for reperforator-transmitter No. 1.

*Attendant's make-busy alarm*

When the attendant at the dispatcher's station wishes to stop the operation of the address circuit, make-busy key 6–MB is operated to close an obvious operating circuit for make-busy relay 8–MB which operates to complete the same operations as hereinbefore described when relay 8–MB fas automatically operated. The attendant must release make-busy key 6–MB in order to clear the busy signal and restore the operating functions at the dispatcher's position.

*Attendant's transmitter stop*

When the attendant wishes to stop the operation of either reperforator-transmitters the transmitter-stop key for that reperforator-transmitter must be operated. The operation of one of these keys will open the transmitter-stop contact circuit of the associated reperforator-transmitter over conductor 7–TS1′ or 11–TS2′. The attendant must release the operated transmitter-stop key to permit the operation of the reperforator-transmitter. The transmitter-stop key should not be operated unless the make-busy key for the same machine is also operated since the dispatcher will then otherwise be aware of the stoppage of the reperforator-transmitter. The transmitter-stop key 6–TS1 is furnished for reperforator-transmitter No. 1 and transmitter-stop key 6–TS2 is furnished for reperforator-transmitter No. 2.

What is claimed is:

1. In a directed message telegraph system wherein coded messages are directed to selected destinations automatically under control of address codes preceding said coded messages, a main tape controlled transmitter of said system for sending addresses followed by messages, a message storing tape controlled transmitter into the tape of which messages may be recorded without addresses, address coding means, address representing elements operable selectively one at a time to selectively derive an address from said address coding means and supply it into the tape of said main transmitter, and means automatically operable by the conclusion of said supply to transfer a message for said address from the storage of said message storing tape transmitter to follow said address into the tape of said main tape transmitter.

2. In a signaling system, a message multiaddress circuit, a plurality of recording and retransmitting instrumentalities, a machine for recording messages locally and transmitting said messages for recordation at one of said instrumentalities, a plurality of operable keys, a plurality of devices respectively responsive to the operation of said keys, a selecting mechanism responsive to a single momentary operation of any one of said keys for engaging, in turn, a plurality of contacts, a coding circuit for producing at each of certain contacts of said plurality the necessary signal currents of a group of signal combinations independently of any operated one of said devices and of another group of signal combinations constituting one or more predetermined addresses of a message, received through any operated one of said devices, a start-stop rotatable element in said one instrumentality responsive to the operation of said one key for transmitting the signal combinations of the first-mentioned group for recordation successively immediately following the message at said one instrumentality and of said other group for recordation successively at said other instrumentality, and means in said address circuit responsive to the recordation of the last signal combination of the first-mentioned group at said one instrumentality for transmitting the message recorded at said one instrumentality for recordation immediately following the last signal combination of the one or more addresses at said other instrumentality.

3. In a telegraph system, a transmitter operable to transmit signals representing a message, a recorder-retransmitter responsive to said signals to record said message, means for generating various control signals to be transmitted preceding the message, selectively operable means for initiating operation of said control signal generating means to generate particular control signals, another recorder-retransmitter responsive to said control signals to record them, a transmission path from the first-mentioned recorder-retransmitter to said other recorder-retransmitter, and means operable by said control signal generating means upon completion of control signal generation for initiating retransmission of said message over said path to said other recorder-retransmitter and recording thereof following said control signals.

4. In a telegraph system, a multiaddress transmission set for automatically appending to a message one or more destination addresses comprising at a station a message sending device, a plurality of address code generating control keys, a first message storing and retransmitting device connected to record messages transmitted by said sending device, signal generating means operable upon operation of any one of said keys to transmit to said first message storing and retransmitting device an end-of-message signal, a second message storing and retransmitting device, other signal generating means controlled by said one key for transmitting to said second storing and retransmitting device one or more predetermined message destination address signals followed by a signal signifying the end of said address signals, and means responsive to transmission of said end-of-address signals for causing retransmission of a recorded message and accompanying end-of-message signals from said first recording and retransmitting device to said second recording and retransmitting device.

5. In a telegraph system, a transmitter operable to transmit signals representing a message, a recorder-retransmitter responsive to said signals to record said message, means for generating various control signals to be transmitted preceding the message, selectively operable means for initiating the operation of said control signal generating means to generate particular control signals, another recorder-retransmitter responsive to said control signals to record them, a transmission path from said first-mentioned recorder-retransmitter to said other recorder-retransmitter, means operable by said control signal generating means upon completion of said control signal generation for initiating retransmission of said message over said path to said other recorder-retransmitter and recording thereof following said control signals, a second transmission path from said other recorder-retransmitter, and a station control circuit and means therein connected to said second transmission path for initiating retransmission of the message stored in said other recorder-retransmitter over said second transmission path.

6. In a telegraph system, a plurality of receiving printer stations selectable by control signals, a transmitter operable to transmit signals representing a message, a recorder-retransmitter responsive to said signals to record said message, means for generating various control signals to be transmitted preceding the message, selectively operable means for initiating operation of said control signal generating means to generate particular control signals, another recorder-retransmitter responsive to said control signals to record them, a transmission path from the first-mentioned recorder-retransmitter to said other recorder-retransmitter, means operable by said control signal generating means upon completion of control signal generation for initiating retransmission of said message over said path to said other recorder-retransmitter and recording thereof following said control signals, a second transmission path from said other recorder-retransmitter, a station control circuit and means therein connected to said second transmission path for initiating retransmission of the message stored in said other recorder-retransmitter for routing under the control of said control signals to two or more of said receiving printer stations, a local loop connected to the first-mentioned transmission path, a key included in said control signal generating means, and means responsive to the operation of said key for routing a message stored at the first-mentioned recorder-retransmitter direct to said local loop independently of said other recorder-retransmitter and transmission path.

7. In a telegraph system, a plurality of receiving printer stations selectable by control signals, a transmitter operable to transmit signals representing a message, a recorder-retransmitter responsive to said signals to record said message, means for generating various control signals to be transmitted preceding the message, selectively operable means for initiating operation of said control signal generating means to generate particular control signals, another recorder-retransmitter responsive to said control signals to record them, a transmission path from the first-mentioned recorder-retransmitter to said other recorder-retransmitter, means operable by said control signal generating means upon completion of control signal generation for initiating retransmission of said message over said path to said other recorder-retransmitter and recording thereof following said control signals, a second transmission path from said other recorder-retransmitter, a station control circuit and means therein connected to said second transmission path for initiating retransmission of said control signals and message stored in said other recorder-retransmitter for routing to two or more of said receiving printer stations, a key in said control signal generating means, and means responsive to the operation of said key for canceling a message stored at the first-mentioned recorder-retransmitter by inhibiting recording of the message by said second-mentioned recorder-transmitter.

8. In a telegraph system, a pluraity of receiving printer stations selectable by control signals, a transmitter operable to transmit signals representing a message, a recorder-retransmitter responsive to said signals to record said message, means for generating various control signals including station selecting signal to be transmitted preceding the message, selectively operable means for initiating operation of said control signal generating means to generate particular control signals, another recorder-retransmitter responsive to said control signals to record them, a transmission path from the first-mentioned recorder-retransmitter to said other recorder-retransmitter, means operable by said control signal generating means upon completion of control signal generation for initiating retransmission of said message over said path to said other recorder-retransmitter and thereof following said control signals, a second transmission path from said other recorder-retransmitter, a station control circuit and means therein connected to said second transmission path for initiating retransmission of said message stored in said other recorder-retransmitter, a local loop connected to the first-mentioned transmission path, a locking key, and means controlled by said locking key for inhibiting transmission of a message recorded in said first-mentioned recorder-retransmitter to either said second-mentioned record-retransmitter or said local loop.

9. In a teletypewriter system, a multiaddress message circuit, a plurality of recording and retransmitting instrumentalities, a teletypewriter comprising a keyboard for recording messages at said teletypewriter and transmitting said messages for recordation at one of said instrumentalities, a plurality of operable keys, a plurality of connecting devices respectively responsive to the operation of said keys, a rotary step-by-step mechanism responsive to a single momentary operation of any one of said keys, an electronic coding circuit for producing at certain of the steps of said step-by-step operation of said mechanism the necessary signal currents of a group of signal combinations independently of any operated one of said connecting devices or of another group of signal combinations constituting one or more predetermined address of a message, received through any one of said connecting devices, a start-stop rotary distributor in said one instrumentality responsive to the operation of said one key for transmitting the signal combinations of the first-mentioned group for recordation successively immediately following the message at said one instrumentality and of said other group for recordation successively at said other instrumentality, and means in said address circuit responsive to the recordation of the last signal combination of the first-mentioned group at said one instrumentality for transmitting the message recorded at said one instrumentality for recordation immediately following the last signal combination of the one or more addresses at said other instrumentality.

10. In a teletypewriter system, a multiaddress message circuit, a plurality of recording and retransmitting instrumentalities, a teletypewriter for recording local copy of messages and for transmitting said messages for recordation at one of said instrumentalities, selecting keys, an operable connecting device responsive to the operation of each of said keys, a coding circuit responsive to the operation of any one of said keys for producing signal currents, a rotary step-by-step mechanism responsive to the operation of any one of said keys for selecting at said coding circuit, independently of any operated one of said connecting devices, signal currents for the marking elements of predetermined function signal combinations, and through the contacts of the operated one of said connecting devices, signal currents for the marking elements of character signal combinations, and means in said circuit responsive to the operation of said step-by-step mechanism during certain steps for transmitting certain function signal combinations to record at said one instrumentality an end-of-message signal immediately following the message, during other steps for transmitting certain character signal combinations to record at the other of said instrumentality the address code signals in predetermined pairs, and during still other steps for transmitting certain function signal combinations to record at said other instrumentality an end-of-address signal immediately following the address signals, other means in said circuit responsive to the completion of transmission of the last signal of the end-of-address signal for transmitting the message and end-of-message signals from said one instrumentality to said other instrumentality and still other means in said circuit responsive to the operation of said step-by-step mechanism during its final step for restoring said circuit to normal condition of readiness for dispatching another message to said other instrumentality.

11. In a teletypewriter system, a multiaddress message circuit, a plurality of operable keys, a plurality of recording and retransmitting instrumentalities, a teletypewriter comprising a keyboard for transmitting messages for recordation at one of said instrumentalities, a locking key included among said keys, relay means in said circuit responsive to the operation of said locking key for conditioning said keyboard to transmit character signals representing a message destination address for recordation at the other of said instrumentality, a transmission path having associated control means responsive to the operation of any one of said keys for disabling the other of said keys, and a plurality of other relay means in said circuit respectively responsive (1) to the release of said locking key following the transmission of one or more address signals for transmitting a group of signal combinations for recordation immediately following the message at said one recording and retransmitting instrumentality and for restoring said other keys to their operable condition; (2) to the transmission of the last signal combination of said group for transmitting another group of signal combinations for recordation immediately following the last signal combination of the address signals at said other instrumentality; (3) to the transmission of the last signal combination of said other group for effecting the transfer of said message and the first message group of signal combinations from said one instrumentality to said other instrumentality; and (4) to the transfer of the last signal combination of the first-mentioned group from said one instrumentality to said other instrumentality for restoring said entire address circuit to normal condition.

12. In a telegraph message storing and retransmitting device, a reperforator, signal generating means for impressing message signals on said reperforator to produce thereby a perforated record medium, a transmitter device including a distributor for retransmitting signals under the control of the record medium produced by said reperforator, and other signal source means cooperable with said distributor for impressing predetermined service signals on said reperforator to cause said service signals to be recorded in said record medium.

13. In a telegraph message storing and retransmitting device, a reperforator having a signal input and adapted to produce a perforated record medium in response to signals impressed on said input, a transmitter device including a distributor for retransmitting the signals contained in the record medium produced by said reperforator, a source of control signals, and means for cooperatively associating said source of control signals and said distributor with said reperforator signal input to cause said control signals to be recorded in said record medium.

14. In a telegraph message storing and retransmitting system, first and second reperforator-transmitter sets each including a distributor as an element of its transmitter mechanism, a source of message signals arranged to transmit only to said first reperforator-transmitter set, means for establishing a transmission path from the tranmitter mechanism of said first reperforator-transmitter set to the reperforator of said second reperforator-transmitter set, and means including a source of control signals cooperable with the distributor of said first reperforator-transmitter set for selectively transmitting to either of said reperforator-transmitter sets.

15. An automatic address transmitting circuit including in combination, transmitter means, a plurality of space discharge devices capable of being permutatively operated to represent message addresses, a plurality of operable means each arranged to selectively operate one or more of said devices, storage means for message codes, other means operable incident to and under control of said operable means to supply to said transmitter means, first, the selected address code signals and then, a group of codes constituting a message from said storage means.

16. An automatic address transmitting circuit including in combination, a plurality of operable keys, a plurality of connecting devices respectively responsive to the operation of said keys, signal current transmitting contacts on each of said connecting devices, a rotary stepping mechanism operable through a complete cycle in response to a single operation of any one of said keys, a coding circuit comprising a plurality of space discharge devices capable of being permutatively operated to produce the necessary signal currents for each of any desired coded signal combinations in response to the operation of said rotary stepping mechanism to one of its contacts, and means for automatically producing signal currents for some of the signal combinations independently of said signal current transmitting contacts on any operated one of said connecting devices.

17. An automatic address transmitting circuit including in combination, a plurality of operable keys, a plurality of connecting devices respectively responsive to the momentary operation of said keys, signal current transmitting contacts on each of said connecting devices, a step-by-step mechanism operable through a complete cycle in response to the single momentary operation of any one of said keys, a coding circuit comprising a plurality of space discharge devices for producing at each of certain steps during the operation of said mechanism the necessary signal currents for each of any desired coded signal combinations, and means for automatically producing some of the signal currents independently of said signal current transmitting contacts on any operated one of said connecting devices.

18. In a signaling system, a plurality of operable keys, a plurality of connecting devices respectively responsive to the momentary operation of said keys, signal current transmitting contacts on each of said connecting devices, a step-by-step mechanism operable through a complete cycle in response to a single momentary operation of any one of said keys, a coding circuit comprising a plurality of space discharge devices for producing at each of certain steps during the operation of said mechanism the necessary signal currents for each of any desired coded signal combinations, means for automatically producing signal currents for some of the signal combinations independently of said signal current transmitting contacts on any operated one of said connecting devices, and means responsive to the operation of any one of said keys for disabling the other of said keys for a predetermined interval of time.

References Cited in the file of this patent

UNITED STATES PATENTS

| | | |
|---|---|---|
| 1,941,916 | Rothermel | Jan. 2, 1934 |
| 1,971,686 | Kinkead | Aug. 28, 1934 |
| 2,103,297 | Nelson et al. | Dec. 28, 1937 |
| 2,179,736 | Bellamy | Nov. 14, 1939 |
| 2,339,293 | Reiber | Jan. 18, 1944 |
| 2,357,297 | Wack et al. | Sept. 5, 1944 |
| 2,376,225 | Beyland | May 15, 1945 |
| 2,441,136 | Charles et al. | May 11, 1948 |
| 2,468,462 | Rea | Apr. 26, 1949 |
| 2,574,362 | Warburton | Nov. 6, 1951 |
| 2,609,452 | Hansen | Sept. 2, 1952 |